United States Patent [19]

Esaki et al.

[11] Patent Number: 5,716,122
[45] Date of Patent: Feb. 10, 1998

[54] OPTICAL APPARATUS USING POLARIZING BEAM SPLITTER

[75] Inventors: Sampei Esaki, Sagamihara; Kunihiko Yoshino, Yokohama; Shingo Inoue, Kawasaki; Katsuhiko Katano; Tetsuo Hattori, both of Yokohama, all of Japan

[73] Assignee: Nikon Corporation, Japan

[21] Appl. No.: 518,884

[22] Filed: Aug. 23, 1995

[30] Foreign Application Priority Data

Aug. 25, 1994 [JP] Japan ................................ 6-200007
Nov. 17, 1994 [JP] Japan ................................ 6-283203
Dec. 27, 1994 [JP] Japan ................................ 6-326198

[51] Int. Cl.⁶ .................................................. G03B 21/14
[52] U.S. Cl. ............................ 353/33; 353/20; 353/8; 349/9; 359/496
[58] Field of Search ........................ 353/7, 8, 31, 33, 353/34, 81, 20; 349/2, 9, 15, 25; 359/462, 465, 464, 496, 495, 497

[56] References Cited

U.S. PATENT DOCUMENTS

| | | | |
|---|---|---|---|
| 3,511,556 | 5/1970 | Ammauu | 359/496 |
| 3,824,002 | 7/1974 | Beard . | |
| 4,127,322 | 11/1978 | Jacobson et al. | 353/31 |
| 4,913,529 | 4/1990 | Golderberg et al. | 353/81 |
| 5,130,826 | 7/1992 | Takanashi et al. | 349/9 |
| 5,264,951 | 11/1993 | Takanashi et al. | 349/9 |
| 5,379,135 | 1/1995 | Nakagaki et al. | 349/9 |
| 5,575,548 | 11/1996 | Lee | 359/465 |
| 5,601,351 | 2/1997 | vanderBrandt | 353/20 |

FOREIGN PATENT DOCUMENTS

| | | | |
|---|---|---|---|
| 53-30508 | 8/1978 | Japan . | |
| 63-39294 | 2/1988 | Japan . | |
| 4267203 | 9/1992 | Japan | 359/496 |

*Primary Examiner*—William Dowling
*Attorney, Agent, or Firm*—Pennie & Edmonds LLP

[57] ABSTRACT

The present invention relates to optical apparatus provided with an optical element for outputting polarized light beams separated generally in parallel. The optical apparatus according to this invention comprises an optical element having a pair of optical members being prisms cross sections of which are right-angled triangles similar to each other, each having a vertex angle of less than 45 degrees, and being constructed in a unitary double prism structure in which the optical members are cemented to each other between side faces thereof, each side face being between the right angle and the vertex angle of less than 45 degrees out of two orthogonal side faces of each optical member, and a polarization splitting portion comprising an optical thin film group formed on the cemented faces of the double prism structure to polarization-split light incident thereto.

17 Claims, 18 Drawing Sheets

OPTICAL APPARATUS USING POLARIZING BEAM SPLITTER

BACKGROUND OF THE INVENTION

1. Field of the Invention

The present invention relates to optical apparatus provided with an optical element having a pair of members each shaped in a cross section of a right-angled triangle and a polarization splitting portion, and more particularly to optical apparatus provided with an optical element having a pair of optical members which have respective cross sections, being similar to each other and being of right-angled triangles with one vertex angle of less than 45 degrees, and a polarization splitting portion.

2. Related Background Art

Examples of conventionally known optical elements used as a polarizing beam splitter (hereinafter referred to as PBS) are those as shown in FIG. 21 and FIG. 22.

The PBS shown in FIG. 21 is constructed in such an arrangement that thin film groups 802a, 802b are formed on hypotenuses of a pair of rectangular prisms 801a, 801b made of optical glass and that these thin film groups 802a, 802b are cemented to each other through a junction part 802c. Refractive indices of thin films composing the thin film groups are determined to satisfy the Brewster's condition. In the art of FIG. 21, the coating 802a is constructed with multiple layers, but the coating 802b is constructed with a single layer and functions as a reflection prevention layer. If light beam 803 from a light source is incident into the PBS from the orthogonal side (the left side in FIG. 21) of the rectangular prism 801a and if an angle of incidence into the interface between the thin film groups is arranged to be the Brewster angle, the incident light is repetitively reflected and refracted at interfaces between the thin films composing the thin film groups, and resultant beams interfere with each other. When the refractive indices and film thicknesses of the thin films are selected so that reflection and refraction properties thereof have polarization dependence, the PBS transmits P polarized beam 804 to one orthogonal side (to the right) and reflects S polarized beam 805 to another orthogonal side (to the top). In FIG. 21, the P polarized beam 804 is polarized light having a plane of oscillation along the plane of the drawing, while the S polarized beam 805 is polarized light having the plane of oscillation perpendicular to the plane of the drawing. In the drawing, double headed arrows represent the direction of oscillation along the plane of the drawing, while black dots do the direction of oscillation perpendicular to the plane of the drawing.

The PBS shown in FIG. 22 is one obtained by putting a total reflection prism on the PBS of FIG. 21, which totally reflects P polarized beam leftward, or in the same direction as the S polarized beam is reflected.

The above PBSs as stated above, however, had the following problems.

Since the P polarized light beam and the S polarized light beam are emergent in different directions from the PBS of FIG. 21, a reflecting optical system is necessary for either one of them in order to guide the two beams onto one body to be illuminated. Particularly, in case of the PBS of FIG. 22 where the total reflection prism is provided to direct the S polarized beam and the P polarized beam in the same direction, optical pathlengths for the S polarized beam and the P polarized beam become extremely different from each other in the prism, causing such a problem that illuminances thereof are different from each other on respective illuminated surfaces.

In case of the arrangement with the total reflection prism outside the PBS, there is another problem of optical losses of polarized light beam.

Further, the apparatus as shown in FIG. 23 is conventionally known as an optical writing image display apparatus for displaying a high-luminance image, using the PBS.

In FIG. 23, white light from a reading light source 820 is incident into the PBS 821 functioning as a polarizer-analyzer herein, where the polarization splitting film splits the incident light into P polarized beam and S polarized beam and transmits P polarized beam while reflecting the S polarized beam.

Here, a polarizer means an optical element for polarizing incident light, and an analyzer does an optical element for transmitting only polarized light. A polarizing beam splitter is an optical element for reflecting certain part of incident light but transmitting or passing through the other part, while polarizing the reflected light and transmitted light. Accordingly, some optical elements function not only as a polarizer, but also as an analyzer depending upon operating conditions. Such optical elements will be called as polarizer-analyzers.

The S polarized beam after reflected is made incident into a spatial light modulator (hereinafter referred to as SLM) 822.

A writing unit 825 writes image information in the SLM 822, which reflects the incident light while modulating polarization of the incident light (S polarized beam reflected by the PBS) according to the image information written therein. The PBS 821 transmits only P polarized beam, which is a pure modulation component in the reflected and modulated light from the SLM 822, and the transmitted light is projected as display light onto a screen 824 through a projection lens 823.

The above optical writing image display apparatus according to the conventional technology, however, wastes the P polarized beam separated by the polarization splitting film out of the reading light beam incident from the reading light source 820 into the PBS 821 because the P polarized beam is not incident into the SLM 822. Thus, the half of light energy from the light source is not used. This becomes a hindrance against size reduction and energy saving of apparatus.

SUMMARY OF THE INVENTION

An object of the present invention is to provide an optical apparatus provided with an optical element in a double prism structure in which a pair of right-angled triangular prisms are cemented to each other with a polarization splitting portion between orthogonal sides of the respective prisms, which is arranged to polarize and split incident light and to output polarized light beams in parallel with each other.

Another object of the present invention is to provide an optical apparatus further comprising a reading light source and an illuminated body for reflecting reading light outgoing from the optical element, which is arranged to output the reading light thus reflected, as an analyzed beam from a hypotenuse on the opposite side to the incident side of the reading light in the optical element.

Still another object of the present invention is to provide an optical apparatus in which the illuminated body is a spatial light modulator for receiving reading light and writing light to modulate and reflect the reading light according to the intensity of the writing light, which is arranged to output the thus modulated light as an analyzed beam.

Still another object of the present invention is to provide an optical apparatus further comprising a projection optical system for projecting the analyzed beam.

Still another object of the present invention is to provide an optical apparatus in which one writing light corresponds to projection light for right eye system and another writing light to projection light for left eye system.

Still another object of the present invention is to provide an optical apparatus further comprising a writing light source, an optical switch for switching writing light emitted therefrom between P polarized beam and S polarized beam in an alternate manner, and a polarizing beam splitter for splitting the writing light.

Still another object of the present invention is to provide an optical apparatus comprising a three-primary-colors splitting optical system for splitting P polarized beam and S polarized beam, being reading light beams as polarization-split, each into the three primary colors, and spatial light modulators each for receiving the P polarized beam and the S polarized beam for each of the three primary colors, receiving writing light corresponding to the respective polarized beams, and modulating the reading light according to the intensity of the writing light.

Another object of the present invention is to provide an optical apparatus in which either one of the P polarized beam and S polarized beam corresponds to the right eye system while the other to the left eye system.

In this manner the present invention can utilize almost 100% of the light from the reading light source and can provide optical apparatus which can be applied to optical writing image display apparatus for displaying high-luminance images or high-luminance stereoscopic images.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The present invention will be described according to the embodiments thereof, but it should be noted that the present invention is by no means intended to be limited to the embodiments.

Figure 1:
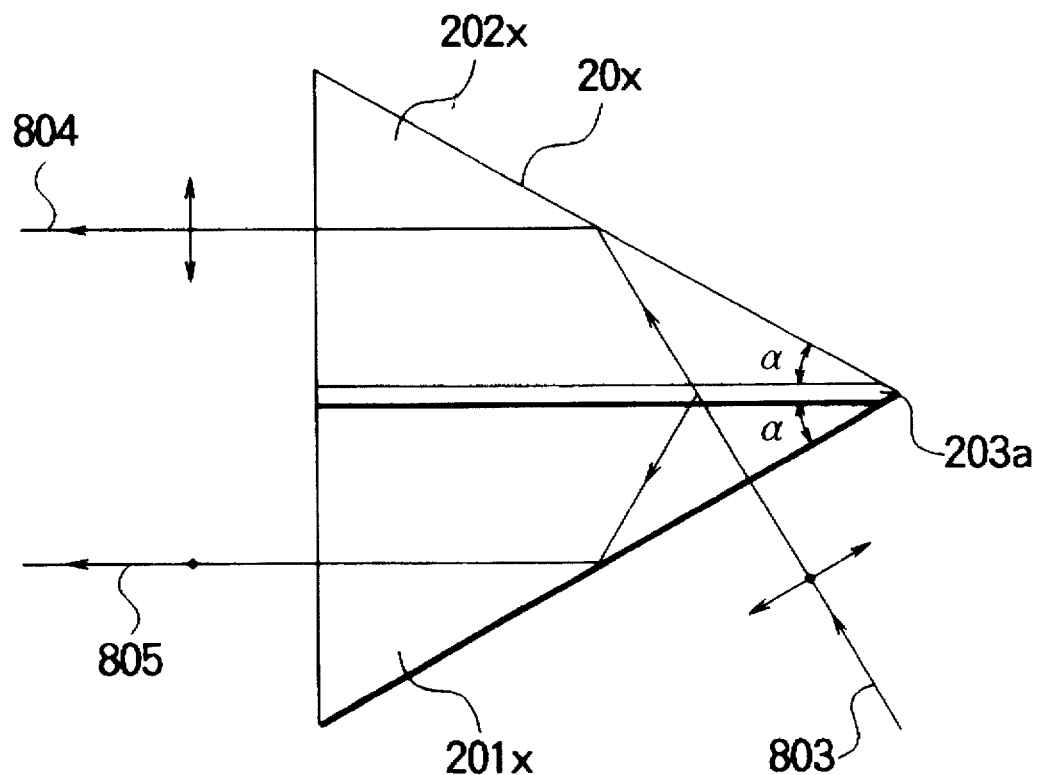
FIG. 1 is a drawing to show a first embodiment of the present invention.

FIG. 1 is an explanatory drawing of the first embodiment of the present invention. In this embodiment, an optical element 20X is constructed in a double prism structure in which two rectangular prisms 201X and 202X in a same size are cemented to each other through a thin film group 203a. The principal cross section of each rectangular prism 201X, 202X is a right-angled triangle with angles of 90 degrees, 60 degrees, and 30 degrees. In detail, the vertex angles α in FIG. 1 are 30 degrees. The optical element 20X is constructed in such a manner that the thin film group is formed on an orthogonal side between the right angle and the vertex angle of 30 degrees, of one of the rectangular prisms, say 201X, and the surface of the thin film group thus formed is cemented with an adhesive layer to an orthogonal side between the right angle and the vertex angle of 30 degrees, of the other rectangular prism 202X. This thin film group 203a is a multi-layer film composed of a combination of high-index thin films and low-index thin films, which is designed and fabricated, for example using the following techniques.

Figure 19:
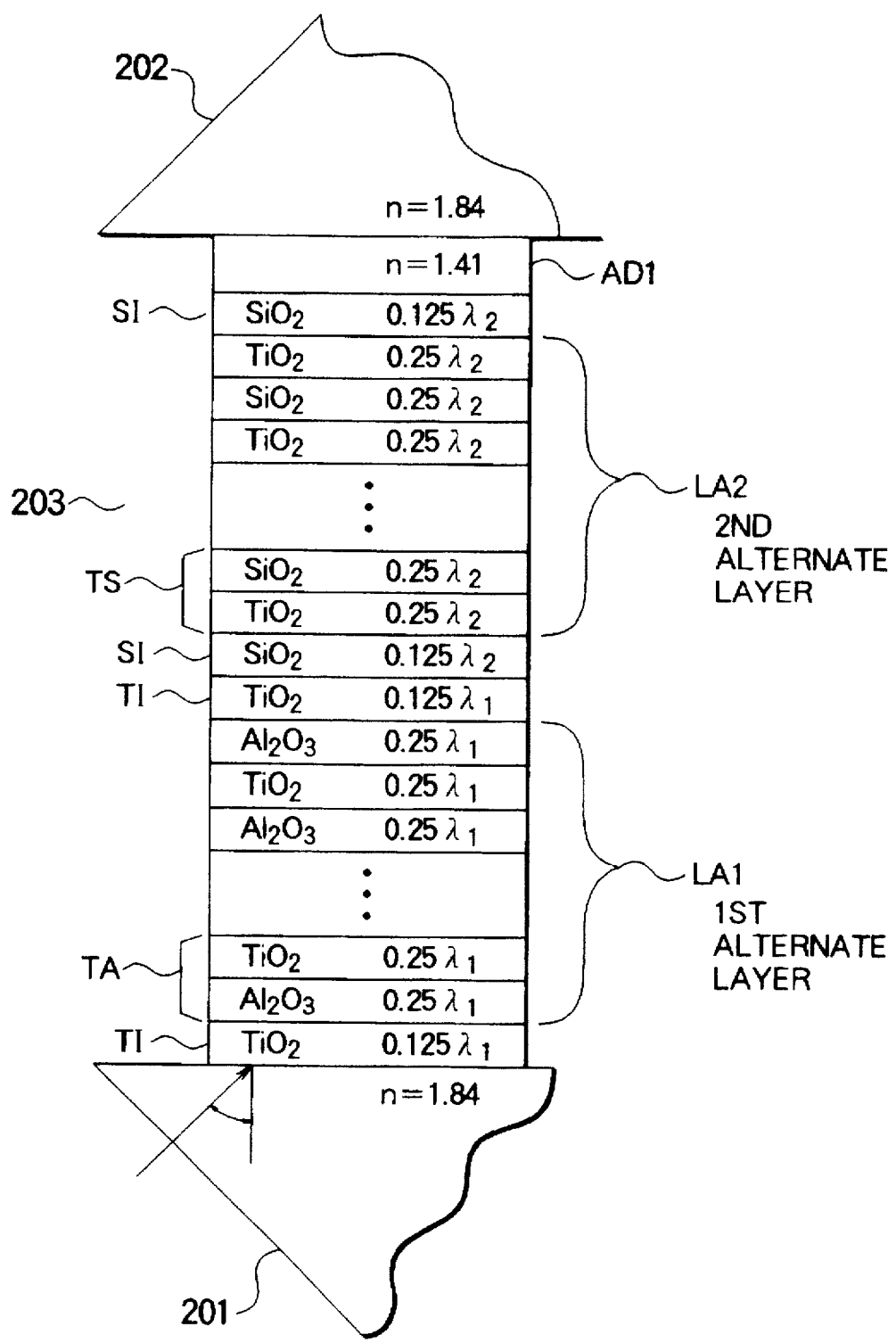
FIG. 19 is a drawing to show an example of thin film groups utilized in a polarization splitting portion in the optical element used in the present invention.

FIG. 19 shows an example of the thin film group between the prisms. In this example, the prisms 201 and 202 are made of an optical glass of a refractive index 1.84.

First, a titanium dioxide ($TiO_2$) layer TI is formed as an adjusting layer in the optical thickness of $0.125\lambda 1$ on one side of one prism 201. Then an alumina ($Al_2O_3$) layer is formed in the optical thickness of $0.25\lambda 1$ on the adjusting layer, and a titanium dioxide (TiO$_2$) layer is further formed in the optical thickness of 0.25λ1 on the alumina layer. Letting one cycle TA be the combination of the alumina (Al$_2$O$_3$) layer in the optical thickness of 0.25λ1 with the titanium dioxide (TiO$_2$) layer in the optical thickness of 0.25λ1, eight cycles are repetitively formed. Then an alumina (Al$_2$O$_3$) layer is formed in the optical thickness of 0.25λ1 further on the layers of the eight cycles. Here, the whole of the eight cycle layers and the last alumina layer will be called as a first alternate layer LA1. The optical thickness herein means the product of physical thickness by refractive index. For example, for a film with refractive index of 1.70, supposing λ1 is 680 nm, the optical thickness 0.25λ1 becomes 0.25×680=170 nm, and thus, the physical thickness is 170/1.70=100 nm.

A titanium dioxide (TiO$_2$) layer TI is formed as an adjusting layer in the optical thickness of 0.125λ1 on the first alternate layer LA1, and a silicon dioxide (SiO$_2$) layer SI is further formed as another adjusting layer in the optical thickness of 0.125λ2 on the adjusting layer.

A titanium dioxide (TiO$_2$) layer is formed in the optical thickness of 0.25λ2 on the adjusting layer SI, and a silicon dioxide (SiO$_2$) layer is further formed in the optical thickness of 0.25λ2 on the titanium dioxide layer. In this manner, letting one cycle TS be the combination of the titanium dioxide (TiO$_2$) layer in the optical thickness of 0.25λ2 with the silicon dioxide (SiO$_2$) layer in the optical thickness of 0.25λ2, six cycles are repetitively formed. A titanium dioxide (TiO$_2$) layer is further formed in the optical thickness of 0.25λ2 on the six cycle layers. The whole of the six cycle layers and the last titanium dioxide layer will be called as a second alternate layer LA2.

A silicon dioxide (SiO$_2$) layer SI is formed as an adjusting layer in the optical thickness of 0.125λ2 on the second alternate layer LA2. In this embodiment, the first alternate layer includes seventeen layers, the second alternate layer does thirteen layers, and the adjusting layers are four in total, thus including thirty four layers in total.

An adhesive AD1 of refractive index 1.41 is laid on the thin film group, and the prism 202 is overlaid on the adhesive to be cemented thereto.

Light to be polarized or analyzed is made incident at an angle of incidence, for example, of about 45 degrees from the side of prism 201 into the thin film group 203 thus formed in the above manner.

The above layers are formed normally by vacuum deposition (PVD or CVD). Further, λ1, λ2 in the above description can take the following values.

|    | For G (Green) | For R (Red) | For B (Blue) |
|----|---------------|-------------|--------------|
| λ1 | 680 nm        | 779 nm      | 556 nm       |
| λ2 | 420 nm        | 481 nm      | 344 nm       |

The above description concerned the example of the fabrication method of the double prism structure in which the thin film group was formed on one side of one prism and the thin film group was cemented with the adhesive to the other prism without a thin film group so as to form the double prism structure, but the double prism structure may be formed employing another fabrication method in which thin film groups are formed each on the two prisms and these thin film groups are cemented to each other with an adhesive layer. This optical thin film group functions as a polarization splitting portion in the optical element 20X.

In the embodiment shown in FIG. 1, the cross section of the optical element 20X is a regular triangle; thus, when the incident light 803 is made incident at the incidence angle of 0 degree to the hypotenuse of the prism 201X, the incident light 803 is split by the optical thin film group 203a into linearly polarized light beams having mutually orthogonal planes of polarization. The two linearly polarized beams each are totally reflected by the internal surfaces of the hypotenuses of the respective prisms 201X and 202X, and thereafter travel in parallel with each other to be emergent from the orthogonal sides other than the cemented sides, of the respective prisms. Since the optical thin film group 203a functions as a polarization splitting portion, a ray 804 transmitted thereby is P polarized beam, while a ray 805 reflected thereby is S polarized beam.

Here, if the vertex angles α exceed 30 degrees, the angle of incidence of the incident light 803 to the hypotenuse of prism 201X must be negative in order to make the outgoing light beams 804 and 805 parallel to each other. Further, if the angles α are greater than 45 degrees, it becomes impossible to make the outgoing light beams 804 and 805 parallel to each other with incidence of the incident light 803 into the hypotenuse of the prism 201X.

Figure 2:
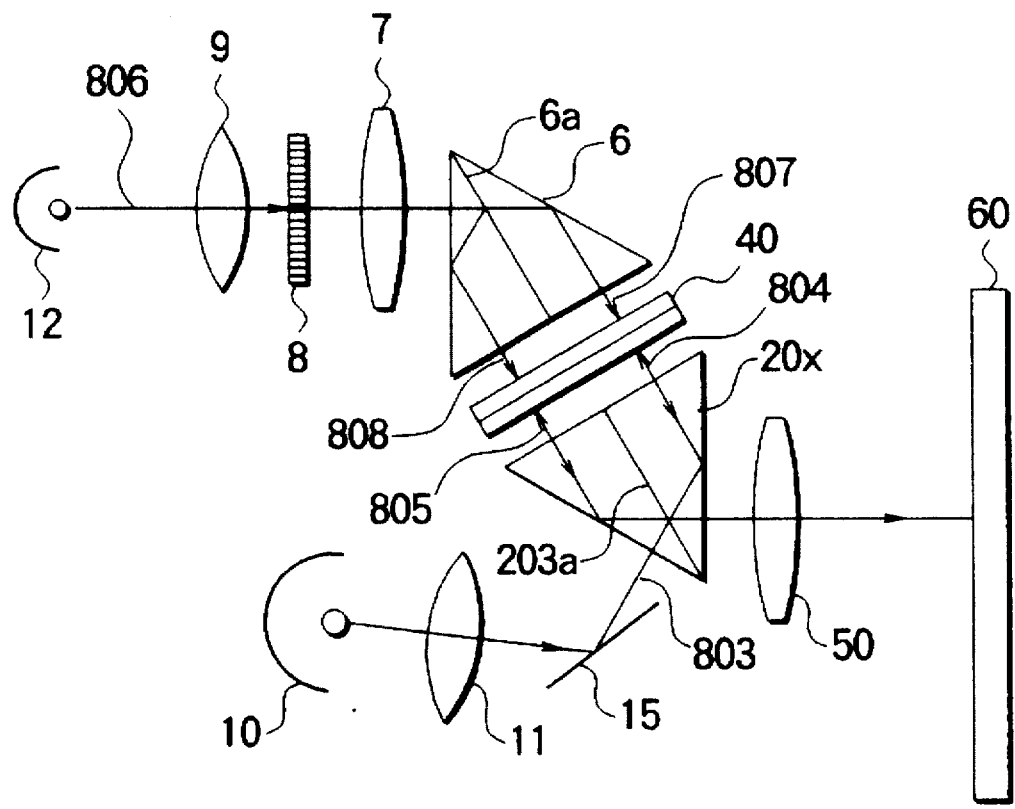
FIG. 2 is a drawing to show a second embodiment of the present invention.

The second embodiment of the present invention is next shown in FIG. 2. This embodiment is provided with the optical element 20X as explained in the first embodiment and a reading light source 10 for emitting reading light 803 toward the optical element 20X. Reference numeral 11 designates a collimation lens for collimating the light beam from the reading light source 10 into nearly parallel rays, and 15 a reflecting mirror for making the parallel rays incident into the optical element 20X. This reflecting mirror 15 can be omitted if the reading light source 10 is located at an appropriate position.

Numeral 40 denotes the SLM for modulating a state of polarization of the reading light emergent from the optical element 20X.

Figure 6:
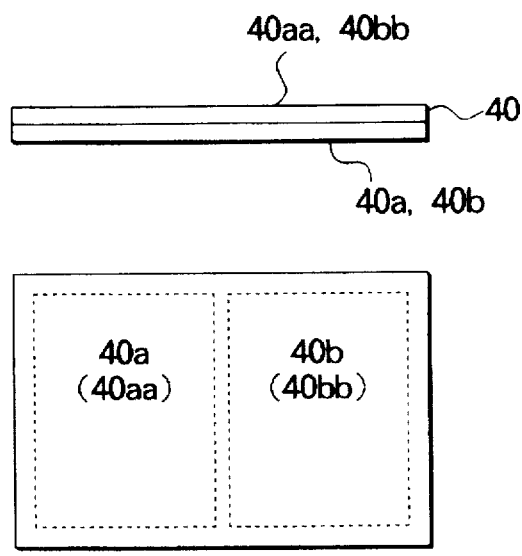
FIG. 6 is a drawing to show a spatial light modulator applicable in the present invention.

The structure of the SLM 40 is explained herein referring to FIG. 6. The SLM 40 has a region 40aa and a region 40bb of light-receiving surfaces for receiving writing light in one surface of SLM, and a region 40a and a region 40b of surfaces for receiving and reflecting the reading light, corresponding to the region 40aa and region 40bb in the other surface of SLM.

The SLM 40 is composed of a photosensitive layer, a light blocking layer, a dielectric mirror layer, and a liquid crystal layer arranged in the stated order from the incident side of the writing light 807, 808 between two transparent electrodes.

The light blocking layer and dielectric mirror layer function to insulate the reading light 804, 805 from the writing light 807, 808, and the dielectric mirror layer functions to reflect the reading light 804, 805 back to the reading light side. These four constituent layers are substantially in a relation of electric series connection in the direction of thickness between the two transparent electrodes to which an ac power supply (not shown) is connected.

The liquid crystal layer is formed in a nematic liquid crystal structure, having a twist angle of 45°, a tilt angle of 2°, and a layer thickness of 4 µm. The optical axis of liquid crystal layer is directed in the direction of oscillation of P polarized beam on the side of reading light 804, 805. When the writing light 807, 808 is incident into the photosensitive layer, the impedance thereof decreases in proportion to the intensity of the writing light 807, 808, resulting in increasing the partial voltage applied on the liquid crystal layer.

When the voltage on the liquid crystal layer is below a threshold value, beams of P polarized light and S polarized light are subjected to optical rotation of 45°; but they are also subjected to optical rotation of 45° in the opposite direction after reflected by the dielectric mirror. Thus, after outgoing from the SLM 40, they have no change in polarization as a result, similarly as in case of isotropic media. When the voltage on the liquid crystal layer exceeds the threshold value, the liquid crystal molecules start standing, thus exhibiting double refraction or birefringence.

FIG. 2 shows the second embodiment of the present invention. The writing light 806 from a writing light source 12 passes through a collimation lens 9 to illuminate a transmission type liquid crystal panel 8. Image information is written in the transmission liquid panel 8, so that rays passing through the transmission liquid crystal panel 8 have image information as writing light. The writing light 806 is then incident through an imaging lens 7 into a beam splitter 6 for amplitude splitting, to be split into two image information pieces in a same intensity and in a same size in a relation of mirror reflection with respect to the amplitude splitting film by the action of the amplitude splitting film 6a (where the amplitude splitting film 6a in the amplitude splitting beam splitter 6 has a function to split the writing light into reflected light and transmitted light at the intensity ratio thereof of approximately 1:1 throughout the entire spectral region), and the respective image information pieces are written in the corresponding regions 40aa, 40bb (FIG. 6) in the SLM 40. Namely, the liquid crystal layer (liquid crystal molecules) has birefringence according to image information written (or according to intensities of the writing light beams 807, 808).

On the other hand, rays 803 from a xenon lamp of reading light source 10 pass through an infrared and ultraviolet cut filter (not shown) and the collimation lens 11 and then are bent by the reflecting mirror 15 (which is not an essential constituent) to enter the optical element 20X, which is the PBS for dual polarization type polarizer-analyzer. The incident light 803 is split into P polarized beam and S polarized beam 804, 805 by the action of the polarization splitting film 203a, and the beams of P polarized beam and S polarized beam are totally reflected by the respective inner surfaces of the prisms and thereafter travel in parallel with each other to enter the regions 40a, 40b (FIG. 6) of surfaces for receiving the incident polarized light in the SLM 40 vertically thereto.

The reading beams 804, 805 entering the SLM 40 are reflected by the dielectric mirror layer; the reading beam 804, which was the P polarized beam before incidence, is given an S polarization component according to the intensity of the writing beam 807, to be converted into elliptically polarized light when leaving the SLM 40; and the reading beam 805, which was the S polarized beam before incidence, is given a P polarization component according to the intensity of the writing beam 808, to be converted into elliptically polarized light when leaving the SLM 40. Rays of elliptically polarized light emerging from two points on the respective regions 40a, 40b corresponding to the writing light receiving surfaces 40aa, 40bb have respective modulation light components of a same intensity.

Namely, the intensity of the S polarization component, which is a modulation component of the reading beam 804 having been the P polarized beam, is equal to that of the P polarization component, which is a modulation component of the reading beam 805 having been the S polarized beam, and major-axis directions of the respective elliptically polarized beams are perpendicular to each other.

The elliptically polarized beams travel backward through optical paths inside the optical element 20X, which is of the double prisms, to be multiplexed and analyzed by the polarization splitting thin film portion 203a, and the S polarization component and P polarization component are displayed as image information through a projection lens 50 on a screen 60. Here, the side-to-side reversed (or mirror reflection) images written in the respective regions 40aa, 40bb in the SLM 40 are transferred to the reading light side as maintaining the side-to-side reversed (or mirror reflection) relation, and the optical element 20X reverses the images from side to side, resulting in displaying an image correct in the left and right relation.

In this embodiment, an optical element 20X is constructed with two identical rectangular prisms 201X and 202X. Consequently the optical pathlengths for the S polarized beam and the P polarized beam are the same in the element, resulting in the same illuminances thereof on respective illuminated surfaces. The other embodiments described hereafter in which two identical prisms are used have the same effect.

Figure 20:
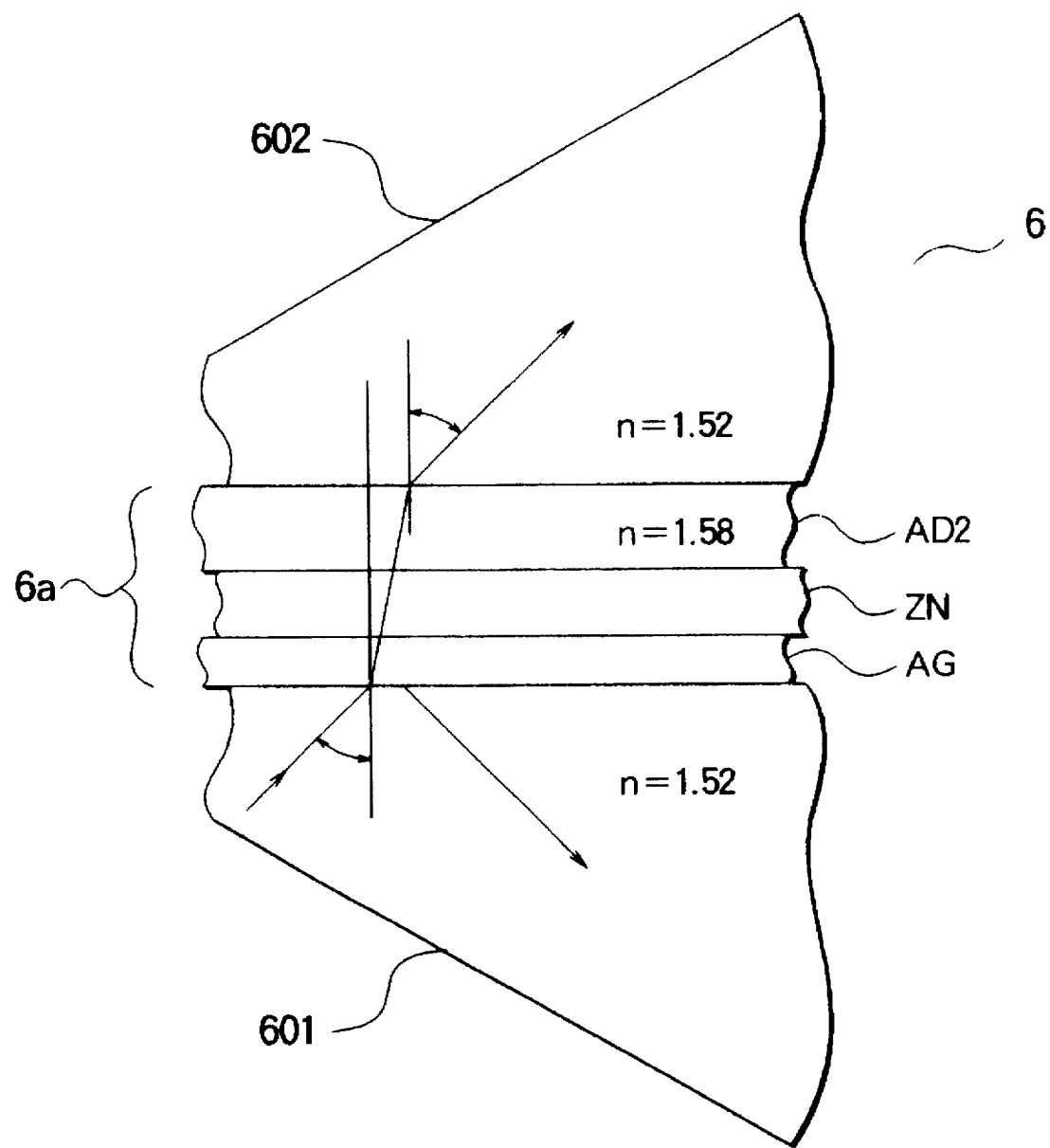
FIG. 20 is a drawing to show an example of an amplitude splitting film in a beam splitter for amplitude splitting, used in the present invention.
Figure 21:
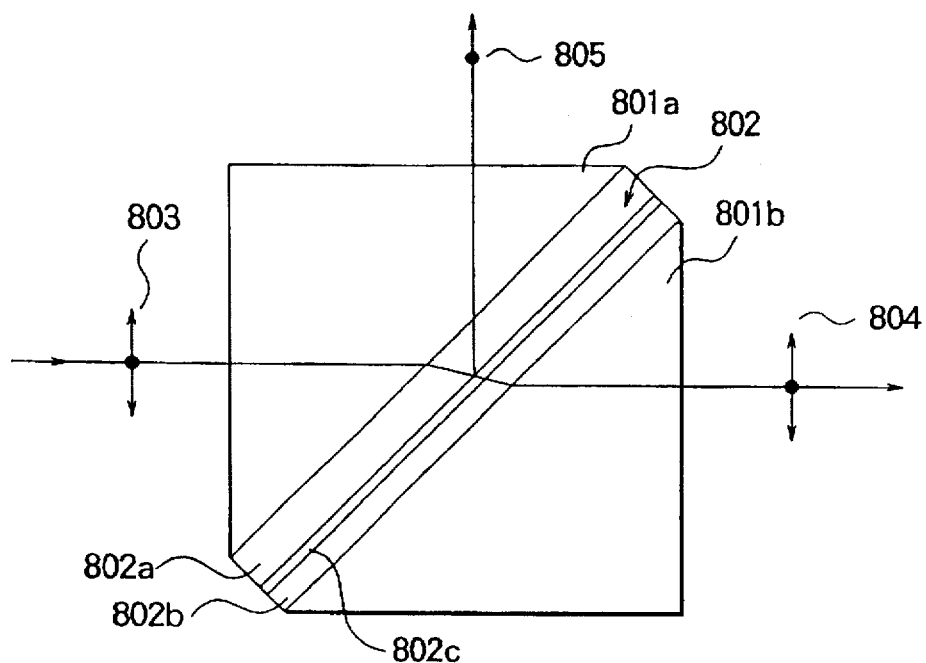
FIG. 21 is a drawing to show a prior art example.

Here, FIG. 20 shows an example of the amplitude splitting film 6a. This shows an enlarged part of the beam splitter 6 for amplitude splitting shown in FIG. 2. In this example, a thin film AG of silver Ag is first formed in the thickness of 19 nm on the surface of prism 601 with refractive index of 1.52 by vacuum deposition. Further, a thin film ZN of zinc sulfide ZnS is formed in the optical thickness of $0.205\lambda$ ($\lambda=690$ nm) on the thin film AG also by vacuum deposition. The surface of the thin film layer is cemented with an adhesive AD2 of refractive index 1.58 to the surface of prism 602 of refractive index 1.52. This thin film group AG, ZN, AD2 forms the amplitude splitting film 6a. The incident light is made incident at an angle of incidence, for example 45 degrees, into the amplitude splitting film 6a to be split into two beams: the half passes through the amplitude splitting film 6a and the other half is reflected thereby.

Figure 3:
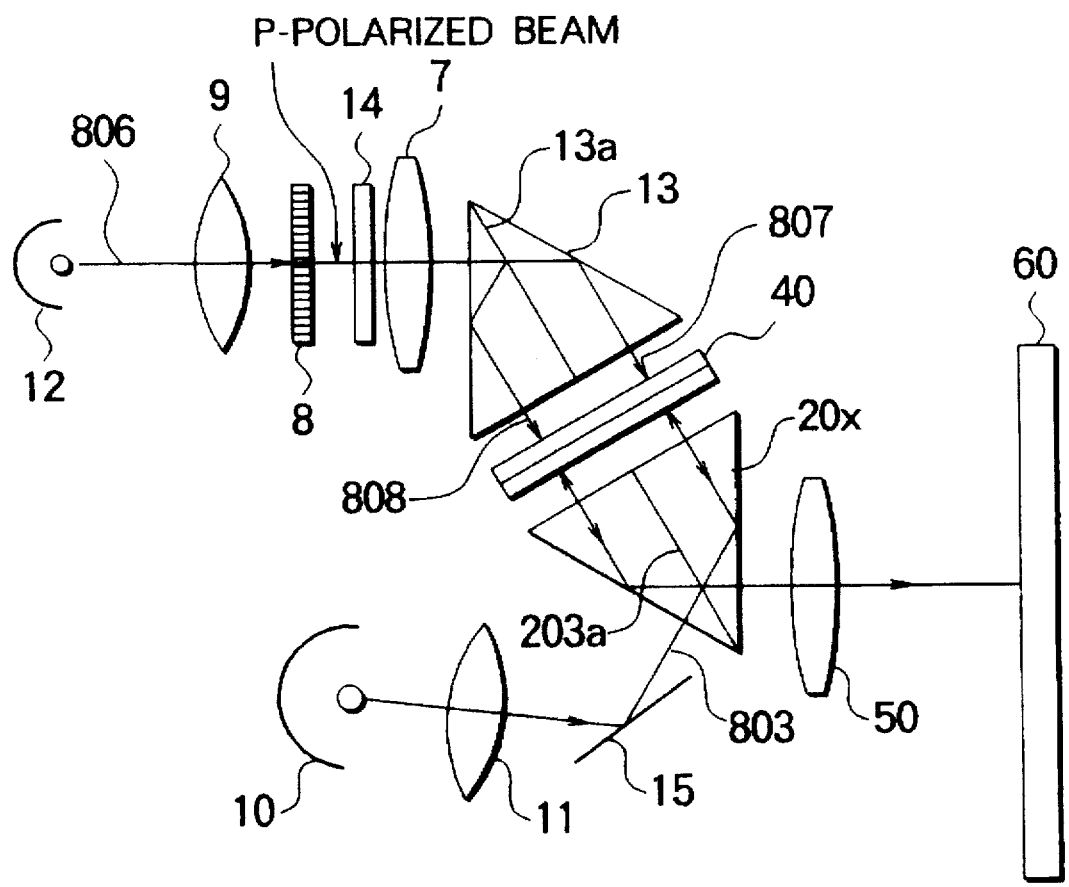
FIG. 3 is a drawing to show a third embodiment of the present Invention.

FIG. 3 shows the third embodiment of the present invention. The present embodiment is arranged to be capable of displaying a stereoscopic image, and is constructed substantially in the same structure as the second embodiment except that the amplitude splitting beam splitter 6 of the second embodiment is replaced by a PBS 13 for dual polarization type polarizer-analyzer having the same function as the optical element 20X used on the reading light side and that a liquid crystal optical switch 14 is added between the transmission type liquid crystal panel 8 and the imaging lens 7.

The transmission type liquid crystal panel 8 is produced so as to transmit P polarized beam and to display image information corresponding to the left eye system and image information corresponding to the right eye system in an alternate fashion.

The P polarized beam having image information corresponding to the left eye system and the P polarized beam having image information corresponding to the right eye system are switched at a frequency of at least 60 Hz, such that the display is presented to each eye at least 30 times per second, since this frequency is the lowest at which the human eyes will not sense flicker.

The liquid crystal optical switch 14 is made to open and close in synchronization with the timing of switching between the image information corresponding to the left eye system and the image information corresponding to the right eye system.

Namely, the transmission type liquid crystal panel displays information of the left eye system in the first half cycle and information of the right eye system in the second half cycle in a display cycle as a total image including left and right images.

Of course, the display order of left and right images is determined for convenience sake of description, and thus is not limited to it.

The liquid crystal optical switch 14 is comprised of a 90°-twisted liquid crystal cell, which has a function to rotate the plane of polarization of transmitted light 90° without application of voltage but to transmit linearly polarized light incident thereinto as not rotating the plane of polarization thereof, with application of voltage.

In displaying the P polarized beam having image information corresponding to the left eye system, the liquid crystal optical switch 14 is open to convert the P polarized beam having image information corresponding to the left eye system into S polarized beam.

In displaying the P polarized beam having image information corresponding to the right eye system, the liquid crystal optical switch 14 is closed to transmit the P polarized beam having image information corresponding to the right eye system as it is.

Namely, the S polarized beam corresponds to the image information for the left eye system and the P polarized beam to the image information for the right eye system. The S polarized light beam and P polarized light beam are imaged by the writing PBS 13 for dual polarization type polarizer-analyzer in such a manner that the S polarized beam corresponding to the left eye image is imaged on the region 40bb of writing light receiving surface of SLM 40 in the first half cycle in the display cycle and the P polarized beam corresponding to the right eye image is imaged on the region 40aa of writing light receiving surface in the next half cycle.

Next, S polarized beam incident into the region 40b of reading light receiving surface is given a P polarization component according to the intensity of the S polarized beam corresponding to the left eye system image information written on the region 40bb, to be converted into elliptically polarized light.

P polarized beam incident into the region 40a of reading light receiving surface is given an S polarization component according to the intensity of the P polarized beam corresponding to the right eye system image information written on the region 40aa, to be converted into elliptically polarized light.

The elliptically polarized beams each travel backward through their optical paths in the optical element 20X, which is the double prisms, and are multiplexed and analyzed by the polarization splitting thin film 203, and left eye system images (S polarized beam) and right eye system images (P polarized beam) are alternately displayed on the same screen. Observing the screen, an observer wears polarization glasses for transmitting only S polarized beam for the left eye and only P polarized beam for the right eye. Thus, a stereoscopic image can be obtained in this manner.

An important point herein is a relation between the time constant (rise and fall times) of SLM 40 and the display cycle of display image information of the transmission type liquid crystal panel. When the time constant of SLM 40 is fully shorter than the display cycle of display image information of the transmission type liquid crystal panel 8, the utility factor of the xenon lamp of reading light source 10 is approximately 50%. If the time constant of rise of SLM 40 is long, for example over 10 msec, the utility factor of the xenon lamp of reading light source 10 can be improved by setting the display cycle of display image information of the transmission type liquid crystal panel 8 to the level equivalent to or below the time constant. In this case, the utility factor can be made substantially close to 100% by setting the display cycle below 10 msec.

Figure 4:
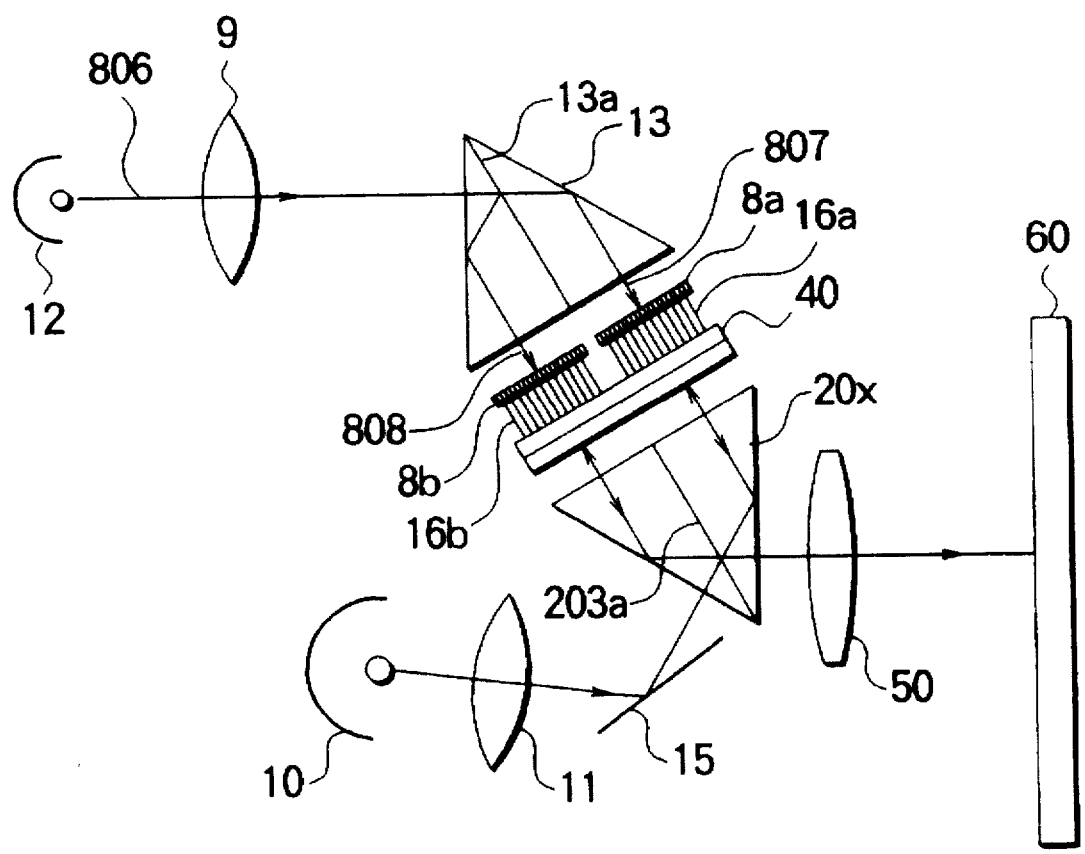
FIG. 4 is a drawing to show a fourth embodiment of the present invention.

FIG. 4 shows the fourth embodiment of the present invention. The present embodiment is arranged to be capable of displaying a stereoscopic image, similarly as the third embodiment. The present embodiment is constructed substantially in the same construction as the third embodiment except that the transmission type liquid crystal panel 8 and liquid crystal optical switch 14 used in the third embodiment are removed and instead thereof there are provided optical fiber plates 16a, 16b one end faces of which are mounted to fit the respective regions 40aa, 40bb of writing light receiving surfaces in SLM 40, and transmission type liquid crystal panels 8a, 8b mounted to fit the other end faces of the respective optical fiber plates. The writing light 806 of parallel rays after transmitted by the collimation lens 9 is split by the optical element 13 into writing beams 807 and 808 to illuminate the respective transmission liquid crystal panels 8a, 8b. The transmission liquid crystal panels 8a, 8b display image information corresponding to the left eye system and image information corresponding to the right eye system, respectively. These image information pieces are transmitted through the respective optical fiber plates 16a, 16b onto the SLM 40 to modulate the reading light beams, similarly as in the third embodiment. Thus, a stereoscopic image can be obtained in this manner.

The PBS 13 for dual polarization type polarizer-analyzer was used as an optical element for supplying the writing beams, but instead thereof the beam splitter 6 for amplitude splitting may be used. Since a necessary point is that the transmission type liquid crystal panels 8a, 8b are uniformly illuminated, the panels may be illuminated simply with parallel rays obtained by any method according to the prior art without using the optical element 6 or optical element 13.

The third embodiment utilizes only the P polarized beam out of the light emitted from the writing light source 12, which makes the quantity of light half; whereas, the fourth embodiment can utilize 100% of light emitted from the writing light source 12 and then transmitted by the collimation lens 9.

Figure 5:
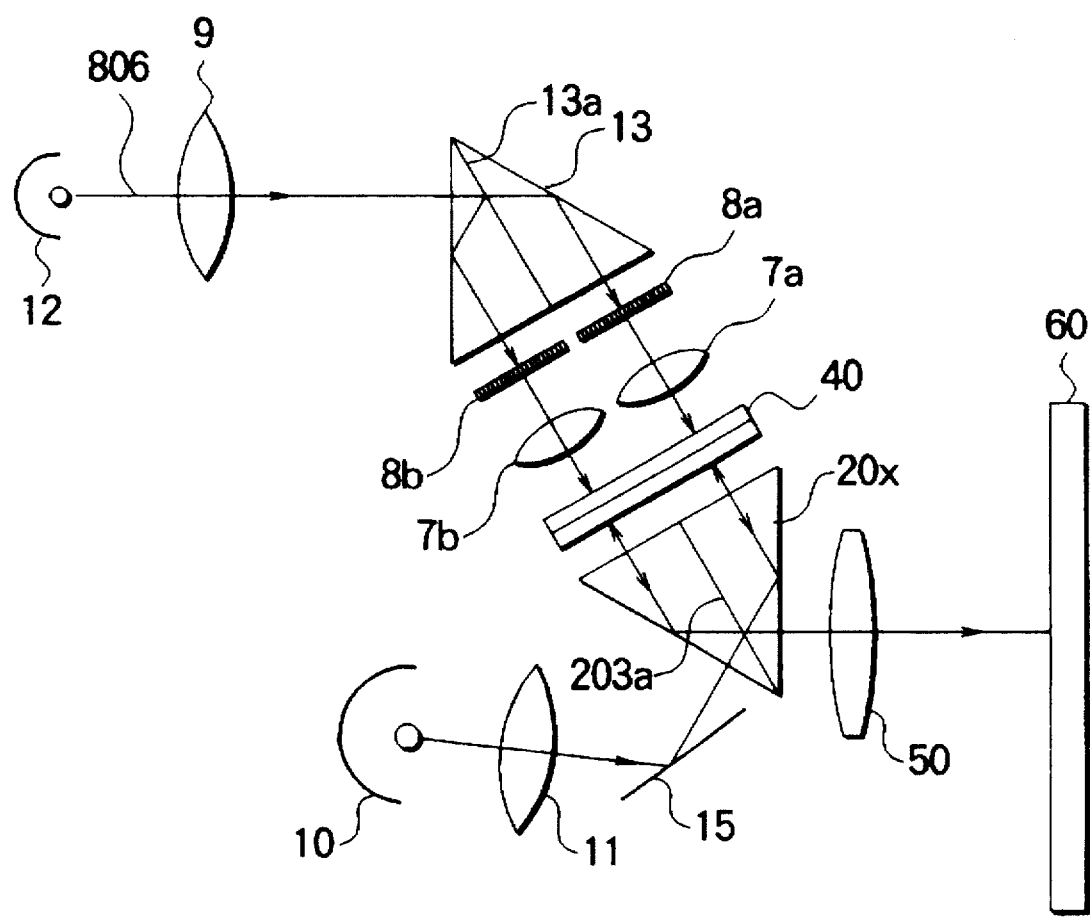
FIG. 5 is a drawing to show a fifth embodiment of the present invention.

FIG. 5 shows the fifth embodiment of the present invention. This embodiment is provided with separate transmission type liquid crystal panels 8a, 8b and imaging lenses 7a, 7b for projecting images formed on the panels onto the SLM 40 in place of the transmission type liquid crystal panels 8a, 8b and optical fiber plates 16a, 16b incorporated therewith in the fourth embodiment. The other arrangement is the same as in the fourth embodiment.

In FIG. 1, the vertex angles α of the prisms 201X, 202X composing the optical element 20X are less than 45 degrees, preferably not more than 30 degrees. In order to make the reading beams 804, 805 emergent from the optical element 20X generally parallel to each other, it is necessary that the reading light 803 be made incident at an angle of incidence between 90 degrees and 0 degree into the hypotenuse of the prism 201X where the vertex angles are greater than 0 degree and not more than 30 degrees; it is necessary that the reading light 803 be made incident at an angle of incidence between 0 degree and such a negative angle as to make an angle of incidence into the optical thin film group 203a equal to 0 degree, where the vertex angles are greater than 30 degrees and less than 45 degrees. The negative angle is determined depending upon the refractive index of the prism 201X.

The SLM 40 in FIG. 6 is integrally formed all on one plane, but another possible arrangement may be constructed in such a manner that the regions 40a and 40aa are formed in an integral part and the regions 40b and 40bb in another integral part, the two parts being arranged to be separately angle-adjusted away from a same plane independently of each other.

In the above embodiment where the reading beams 804, 805 are parallel to each other, the above two parts should be adjusted to be located on a same plane; in the cases where the reading beams are not parallel, the above two parts should be properly adjusted away from the plane so that the reading beams are incident at the angle of incidence of 0 degree into the regions 40a, 40b. This arrangement of the SLM 40 can obviate a need to make the reading beams 804, 805 precisely parallel.

When the above two parts are located on a same plane, the reading beams 804, 805 can be adjusted to be parallel by adjusting the angle of incidence of the reading light 803 into the optical element 20X.

As detailed above, according to the present invention, the optical writing display apparatus splits the writing light having image information by the amplitude splitting beam splitter provided on the writing light side to write mirror images in a same intensity and a same size in the regions of writing light receiving surfaces in SLM.

Then the light from the reading light source is polarization-split into P polarized beam and S polarized beam by the PBS for dual polarization type polarizer-analyzer provided on the reading light side, and the P polarized light and S polarized light beams are made to impinge on the corresponding regions in the SLM. Since the light from the reading light source can be utilized substantially about 100% by the functions of PBS to multiplex and analyze the two reflected and modulated beams and to reverse the mirror images, the display luminance of apparatus can be greatly improved and the apparatus can be constructed in a compact size as realizing great energy saving.

If the amplitude splitting beam splitter on the writing light side is replaced by the PBS for dual polarization type polarizer-analyzer and the liquid crystal optical switch and if the display cycle of the transmission type liquid crystal panel is further synchronized with the time constant of SLM, the light from the reading light source can be utilized substantially about 100%, which improves the display luminance of apparatus and which enables the apparatus to be constructed in a compact size as greatly saving energy.

Figure 7:
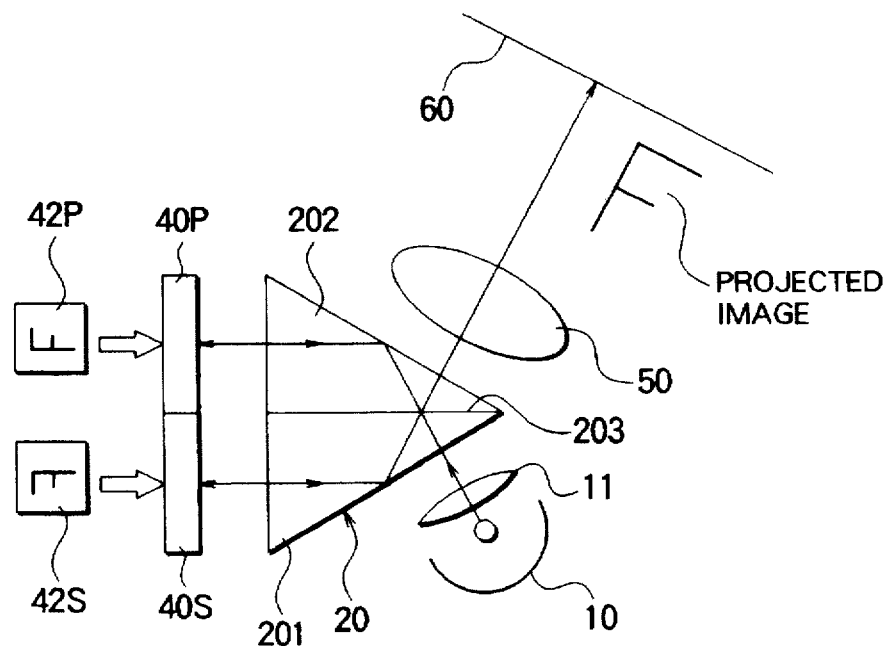
FIG. 7 is a drawing to show a sixth embodiment of the present invention.

FIG. 7 is a drawing to show the schematic structure of a projection apparatus as the sixth embodiment according to the present invention. Numeral 10 designates a reading light source, 11 a collimation lens for collimating the light beam from the reading light source 10, and 20 a PBS as an optical element for splitting the light from the light source 10 into P polarized beam and S polarized beam. Further, 40P and 40S are SLMs for modulating the P polarized beam and S polarized beam, respectively, coming from the optical element 20. In addition, 42P and 42S are CRTs (cathode-ray-tubes) for forming respective writing images to be written in the SLMs 40P and 40S. The images from the respective CRTs are written in the SLMs 40P and 40S, using a relay lens or optical fiber optical system (not shown). Numeral 50 denotes a projection lens for projecting the light from the optical element 20 to a screen 60.

The embodiment of FIG. 7 operates in the same manner as the embodiment of FIG. 2 except that the images of CRTs 42P, 42S are written into the SLMs 40P, 40S, whereby the images are projected through the projection lens 50 onto the screen 60. Here, the modulated light from SLM 40P is totally reflected twice in the optical element 20, whereas the modulated light from SLM 40S is totally reflected once. Thus, the writing images of CRTs 42P and 42S are formed as symmetric with each other, thereby making the same projected images superimposed on the screen 60.

In the projection apparatus of the present embodiment, the P polarized light and S polarized light beams split by the polarization splitting optical element 20 are used as reading light beams, and the P polarized light and S polarized light beams are modulated according to the writing images as formed in symmetry with each other in the SLMs 40P and 40S to be multiplexed and projected to the screen 60, which can improve the utilization factor of light source and which can obtain brighter projection images, as compared with the conventional projection apparatus using only the S polarized beam as a reading beam.

Figure 8:
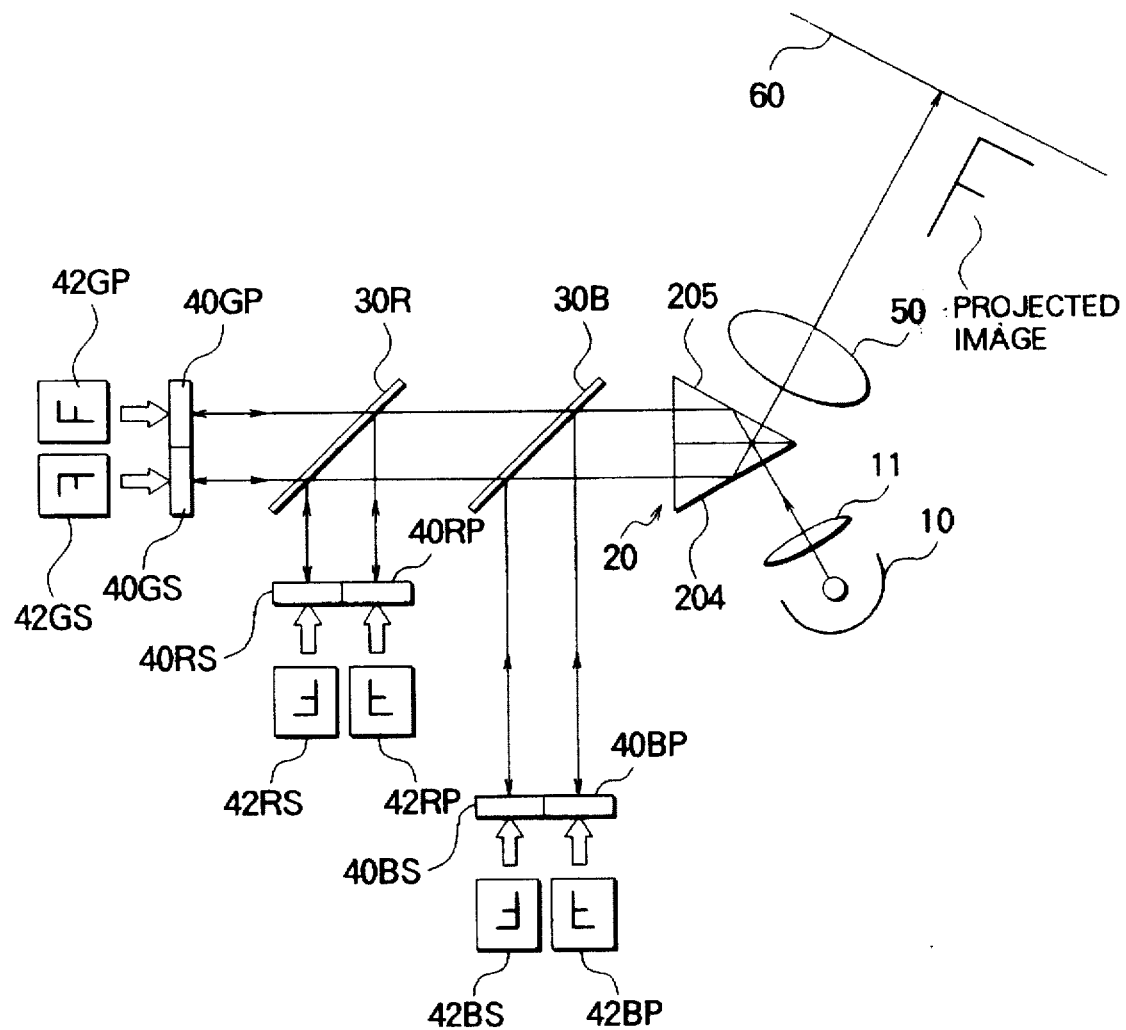
FIG. 8 is a drawing to show a seventh embodiment of the present invention.

FIG. 8 is a drawing to show the seventh embodiment according to the present invention and to show the schematic structure of a full color projection apparatus using a three-colors splitting optical system. In FIG. 8, same portions as those in FIG. 7 are denoted by the same reference numerals, and the description will be focused on different portions. Reference codes 30B and 30R denote dichroic mirrors composing the three-colors splitting optical system, which reflect blue light and red light, respectively. Codes 40BP and 40BS are SLMs to which blue light beams of P polarized light and S polarized light reflected by the dichroic mirror 30B are incident. Similarly, 40RP and 40RS are SLMs to which red light beams of P polarized light and S polarized light reflected by the dichroic mirror 30R are incident, and 40GP and 40GS are SLMs to which green light beams of P polarized light and S polarized light transmitted by the both dichroic mirrors 30B and 30R are incident. Codes 42BP and 42BS are CRTs for forming writing images to the SLMs 40BP and 40BS, respectively, and writing images corresponding to the blue P polarized beam and S polarized beam are formed in the CRTs 42BP and 42BS. Similarly, 42RP and 42RS are CRTs for forming writing images corresponding to the red light, and 42GP and 42GS CRTs for forming writing images corresponding to the green light.

Next explained is the operation of the projection apparatus according to the seventh embodiment. After collimated by the collimation lens 11, the light from the light source 10 is split into P polarized beam and S polarized beam by the PBS 20 to be emergent from PBS 20. Emerging from the PBS 20, the P polarized light and S polarized light beams reach the dichroic mirror 30B, which reflects blue light of the P polarized beam and S polarized beam, and the blue light beams of the P polarized light and S polarized light are incident as reading light beams to the SLMs 40BP and 40BS, respectively. Similarly, passing through the dichroic mirror 30B, the P polarized light and S polarized light beams reach the dichroic mirror 30R, which reflects red light of the P polarized beam and S polarized beam, and the red light beams of the P polarized light and S polarized light are incident as reading light beams into the SLMs 40RP and 40RS, respectively. Further, passing through the both dichroic mirrors 30B and 30R, the green light of the P polarized beam and S polarized beam are incident as reading light beams to the SLMs 40GP and 40GS, respectively.

The writing images corresponding to the blue P polarized beam and S polarized beam are written in the SLMs 40BP and 40BS by the CRTs 42BP and 42BS. The P polarized beam entering the SLM 40BP is subjected to double refraction according to the writing image; P polarized beam entering a portion where writing light is present is changed into S polarized beam to be output from the SLM 40BP. This can also be applicable to the S polarized beam entering the SLM 40BS, and modulation light according to the writing image corresponding to the blue S polarized beam is modulated into P polarized beam to be output from the SLM 40BS. The same is applicable to the SLMs 40RP, 40RS, 40GP, and 40GS.

Modulated light beams from the respective SLMs 40BP to 40GS travel backward in respective optical paths to enter the PBS 20. P polarized light beams included in the modulated light beams from the SLMs 40BP, 40RP, 40GP and S polarized light beams included in the modulated light beams from the SLMs 40BS, 40RS, 40GS, which are polarized light beams not modulated because they were incident into portions where the writing light was absent, are multiplexed by the polarization splitting portion 203 to be output from the surface 204 of PBS 20 toward the light source 10. On the other hand, S polarized light beams included in the modulated light beams from the SLMs 40BP, 40RP, 40GP and P polarized light beams included in the modulated light beams from the SLMs 40BS, 40RS, 40GS, which are polarized light beams modulated because they were incident into portions where the writing light was present, are multiplexed by the polarization splitting portion 203 to be output from the surface 205 of PBS 20 toward the screen 60. The polarized light beams emerging from the surface 205 of PBS 20 are projected through the projection lens 50 onto the screen 60.

From the same reason as described above, in order to make same projection images superimposed on the screen 60, the writing images formed by CRTs 42BP and 42BS are identical and symmetric with each other. This is also the case with the writing images formed by CRT 42RP and CRT42RS and with the writing images formed by CRT 42GP and CRT 42GS. Further, because the SLMs 40BP to 40GS are conjugate with the screen with respect to the projection lens 50, optical pathlengths are equally set from the respective SLMs 40BP–40GS to the screen.

The projection apparatus of the present embodiment can improve the utilization factor of the light from the light source and can obtain brighter full color projection images, similarly as in the sixth embodiment.

Figure 9:
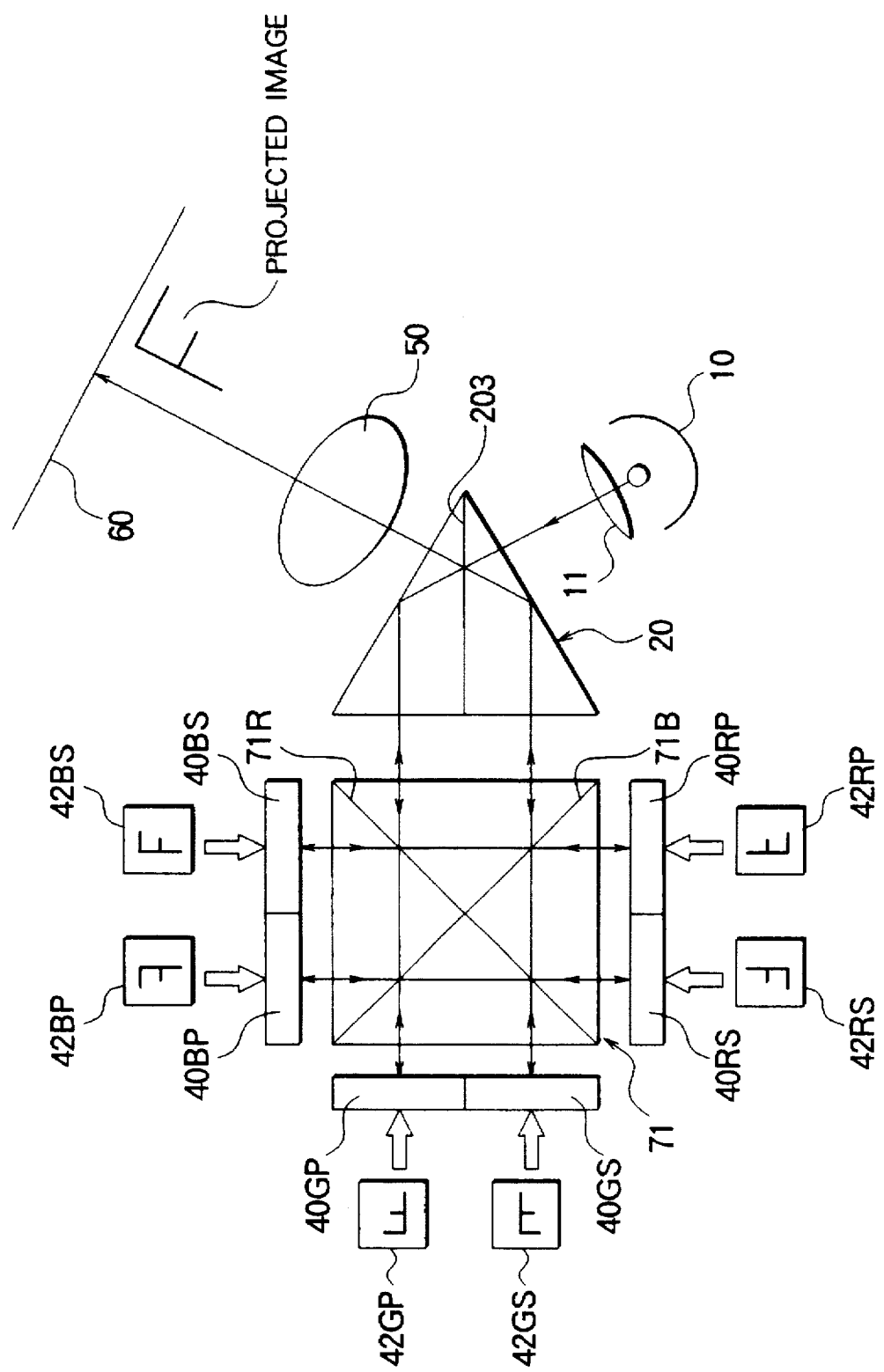
FIG. 9 is a drawing to show an eighth embodiment of the present invention.

FIG. 9 is a schematic structural drawing to show the eighth embodiment according to the present invention and to show an example of projection apparatus using a cross dichroic prism as the three-colors splitting optical system. Reference numeral 71 denotes the cross dichroic prism, in which a blue reflecting dichroic film 71B and a red reflecting dichroic film 71R are formed as perpendicular to each other. The other portions in the drawing are the same as in the projection apparatus of FIG. 8.

Among the P polarized beam and S polarized beam emitted from the PBS 20 and entering the cross dichroic prism 71, blue light beams thereof are reflected toward the SLMs 40BP and 40BS, respectively, by the blue reflecting dichroic film 71B, and red light beams thereof are reflected toward the SLMs 40RP and 40RS, respectively, by the red reflecting dichroic film 71R. Green light beams of the P polarized light and S polarized light pass through the both blue reflecting dichroic film 71B and red reflecting dichroic film 71R to enter the SLMs 40GP and 40GS, respectively. The polarized light beams incident are modulated according to images written in the respective SLMs 40BP to 40GS and then are output from the respective SLMs 40BP to 40GS. The light beams emerging from the respective SLMs 40BP to 40GS are three-colors-multiplexed by the blue reflecting dichroic film 71B and red reflecting dichroic film 71R and the thus multiplexed light is emergent from the cross dichroic prism 71 toward the PBS 20. The operation after PBS 20 is the same as in the seventh embodiment shown in FIG. 8. Further, the symmetry relation of the writing images formed in the CRTs 42BP–42GS is the same as in the seventh embodiment.

The projection apparatus of the present embodiment can improve the utilization factor of the light from the light source and can obtain brighter full color projection images, similarly as in the seventh embodiment. Further, because the present embodiment employs a cross dichroic prism 71 for splitting and multiplexing the three colors, the apparatus can be constructed in a compact size, as compared with the projection apparatus using two dichroic mirrors as shown in FIG. 8.

Figure 10:
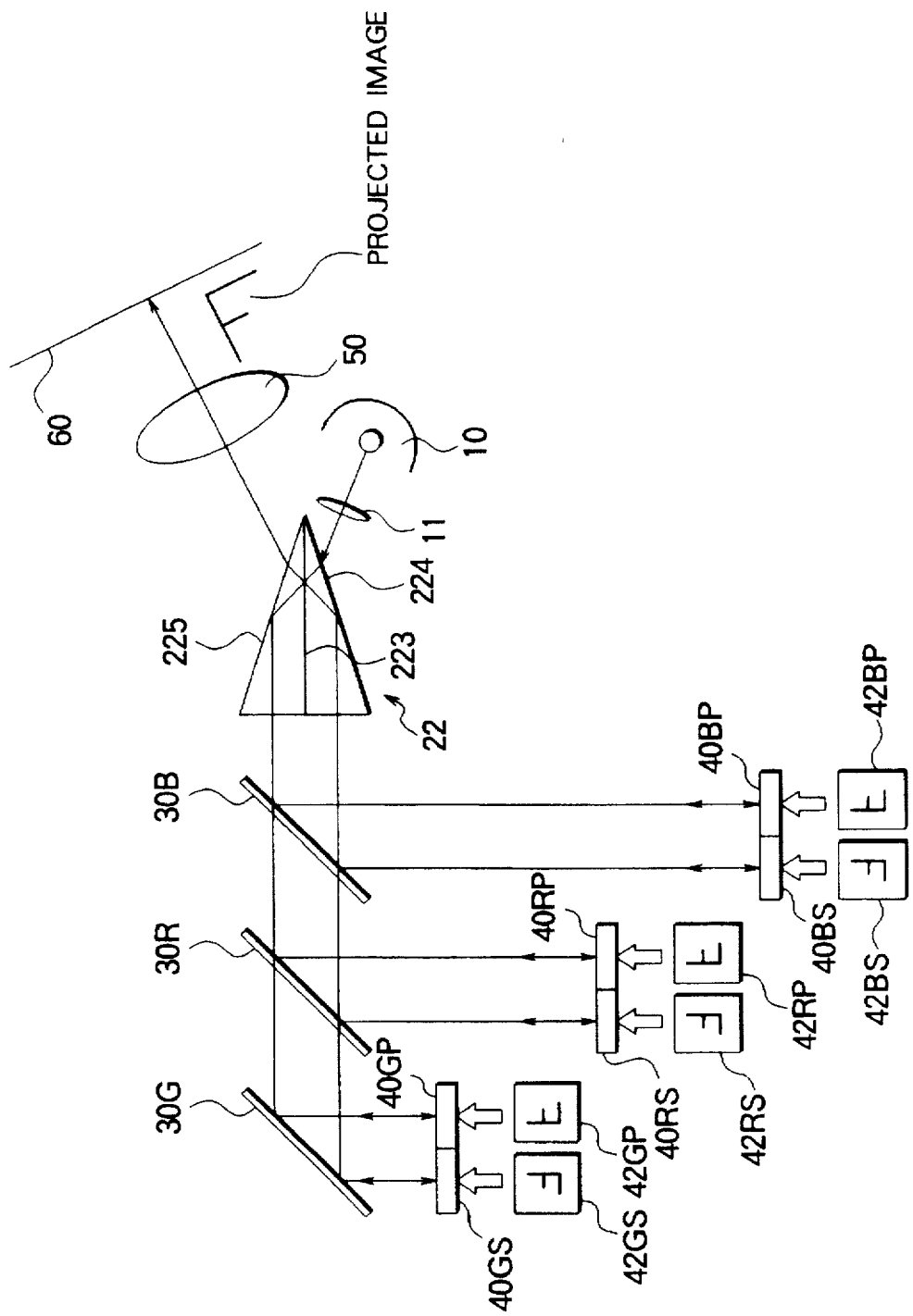
FIG. 10 is a drawing to show a ninth embodiment of the present invention.

FIG. 10 is a schematic structural drawing to show the ninth embodiment of the projection apparatus according to the present invention. In FIG. 10, numeral 22 denotes a PBS and 30G a dichroic mirror for reflecting green light. The other portions are the same as those in the seventh embodiment. The detailed structure and function of the PBS 22 is next explained referring to FIG. 11. The PBS 22 is constructed in such an arrangement that two optical members 221 and 222 with a cross section of a right-angled triangle are cemented to each other into a unit and a polarization splitting portion 223 of a dielectric multi-layer film is formed between the cemented surfaces. The cross section of each optical member 221, 222 is a right-angled triangle with a vertex angle on the cemented surface side being smaller than 30 degrees and the other vertex angle being larger than 60 degrees. With this PBS 22, an angle of incidence of the light from the light source is determined so that the P polarized light beam transmitted by the polarization splitting portion 223 and totally reflected by the surface 225 and the S polarized light beam reflected by the polarization splitting portion 223 and totally reflected by the surface 224 are emergent normally from emergent surfaces 226 and 227, respectively. This angle of incidence is uniquely determined by the shapes and refractive indices of the optical members composing the PBS 22.

Figure 11:
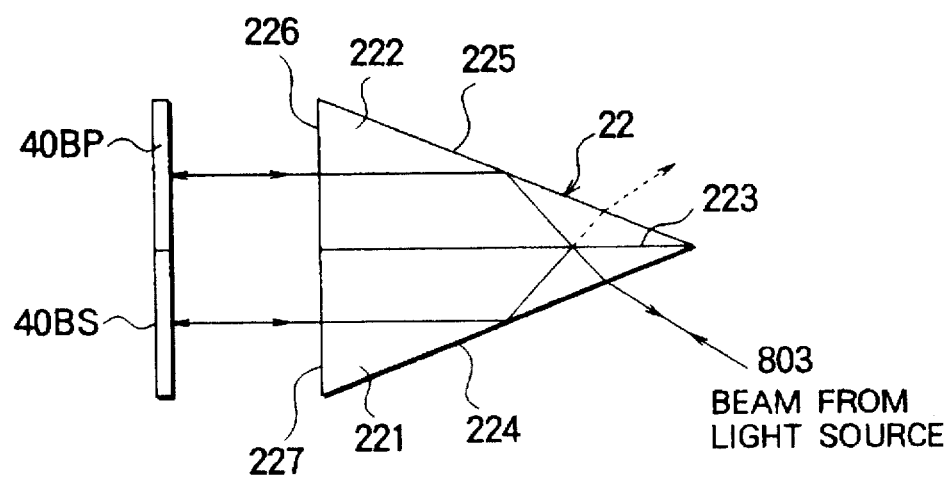
FIG. 11 is a drawing to illustrate detailed structure and function of PBS 22.

FIG. 11 shows the SLMs 40BP and 40BS to which blue light beams reflected by the dichroic mirror 30B are incident, for description of PBS 22. The dichroic mirror 30B is omitted. The P polarized beam and S polarized beam emerging from the PBS 22 are incident to the SLMs 40BP and 40BS, respectively. Here, if the P polarized beam and S polarized beam from the PBS 22 are not modulated by the SLMs 40BP and 40BS, the P polarized beam and S polarized beam travel backward in respective optical paths and are multiplexed by the polarization splitting portion 223 to be output from the surface 224 of PBS 22. On the other hand, if the P polarized beam and S polarized beam from the PBS 22 are modulated by the SLMs 40BP and 40BS into S polarized beam and P polarized beam, respectively, the S polarized beam totally reflected by the surface 225 is reflected by the polarization splitting portion 223 and the P polarized beam totally reflected by the surface 224 is transmitted by the polarization splitting portion 223. Then the S polarized light beam and P polarized light beam are multiplexed by the polarization splitting portion 223, as represented by the dashed line in the drawing, to be output from the surface 225 of PBS 22.

Next explained is the operation of the projection apparatus shown in FIG. 10. Among the P polarized beam and S polarized beam outgoing from the PBS 22, blue light is reflected by the dichroic mirror 30B and red light by the dichroic mirror 30R, similarly as in the seventh embodiment. Further, the present embodiment is so arranged that the P polarized light and S polarized light beams passing through the dichroic mirrors 30B and 30R are made incident to the dichroic mirror 30G for reflecting green light and that reflected light from the dichroic mirror 30G is made incident to the SLMs 40GP and 40GS. Polarized light beams modulated by and output from the SLMs 40BP–40GS are three-colors-multiplexed by the respective dichroic mirrors 30B–30G to be output toward the PBS 22. Polarized light impinging on portions where the writing light is present in each SLM 40BP–40GS is modulated, and the polarized light thus modulated is output from the PBS 22 and thereafter is projected through the projection lens 50 onto the screen 60.

The present embodiment can also improve the utilization factor of the light source and can obtain brighter projection images, similarly as the seventh embodiment. Further, with PBS 22, when the incident light is totally reflected by the side surfaces 224 and 225, the angles of incidence to the side surfaces can be set greater than those of PBS 20 with a cross section of a regular triangle, thus presenting an advantage that the tolerance is large for total reflection. When the light beam from the light source is collimated by the collimation lens 11, there are some errors in degree of collimation, but all rays can be totally reflected well with the PBS 22 as described above, which further improves the utilization factor of the light source.

Figure 12:
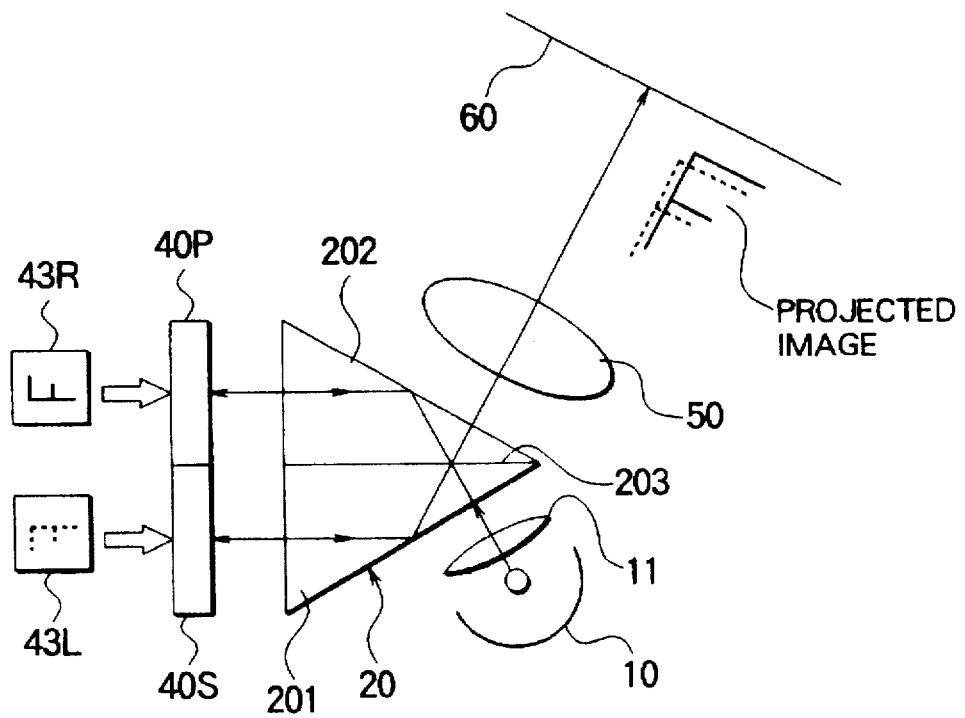
FIG. 12 is a drawing to show a tenth embodiment of the present invention.

FIG. 12 is a schematic structural drawing to show the tenth embodiment of the projection apparatus according to the present invention, which is constructed as a stereoscopic image projection apparatus similar to the third embodiment of FIG. 3. Same portions as those in FIG. 3 and FIG. 7 are denoted by the same reference numerals, and the description is focused on different portions. Reference codes 43R and 43L are CRTs for forming writing images corresponding to projection images of the right eye system and left eye system, respectively.

This embodiment operates in the same manner as the embodiment of FIG. 3 except that the images of CRTs 43R, 43L are written in the SLMs 40P, 40S, and images are projected through the projection lens 50 onto the screen 60. Here, modulated light from SLM 40P is totally reflected twice in the optical element 20, while modulated light from SLM 40S is totally reflected once. Thus, if the writing images of CRTs 43R and 43L are formed as symmetric with each other, same projection images are coupled as superimposed on the screen 60. Observing through polarization glasses, the observer can observe a stereoscopic image.

In the projection apparatus of the present embodiment, the light from the light source is split into P polarized beam and S polarized beam by the PBS 20, the writing image corresponding to the projection image of the right eye system is written in the SLM 40P to which the P polarized beam is incident, and the writing image corresponding to the projection image of the left eye system is written in the SLM 40S to which the S polarized beam is incident, thus easily realizing the stereoscopic image projection apparatus. Opposite to the present embodiment, another possible arrangement may be constructed in such a manner that the writing image corresponding to the projection image of the right eye system is written in the SLM 40S and the writing image corresponding to the projection image of the left eye system is written in the SLM 40P.

Figure 13:
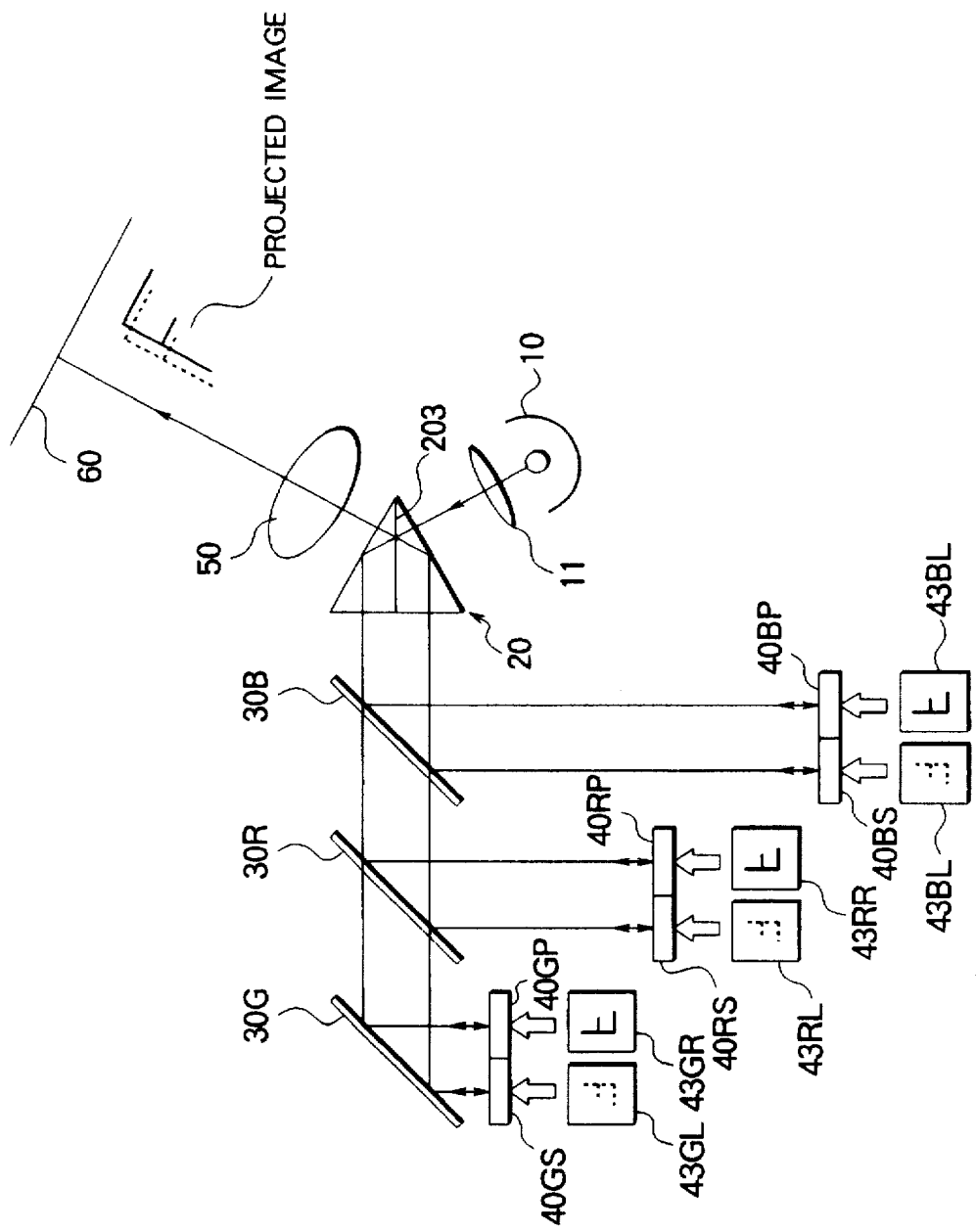
FIG. 13 is a drawing to show an eleventh embodiment of the present invention.

FIG. 13 is a schematic structural drawing to show the eleventh embodiment of the projection apparatus according to the present invention. Same portions as those in FIG. 10 are denoted by the same reference numerals, and the description is focused on different portions. In FIG. 13, the PBS shown in FIG. 1 is used as a polarizing optical element in place of the PBS 22 used in FIG. 10. Further, 43BR, 43RR, and 43GR are CRTs for forming writing images of the right eye system corresponding to blue light, red light, and green light, respectively, and 43BL, 43RL, and 43GL are CRTs for forming writing images of the left eye system corresponding to blue light, red light, and green light, respectively.

Blue light, red light, and green light of the P polarized beam reflected by the respective dichroic mirrors 30B, 30R, and 30G are made incident as reading beams to the SLMs 40BP, 40RP, and 40GP, respectively. The writing images of the right eye system corresponding to the respective colors are written in the SLMs 40BP, 40RP, and 40GP by the CRTS 43BR, 43RR, and 43GR. When modulated light beams emerging from the respective SLMs 40BP, 40RP, and 40GP are projected onto the screen 60, the modulated light beams are multiplexed to form a full color projection image of the right eye system on the screen 60.

On the other hand, blue light, red light, and green light of the S polarized beam reflected by the respective dichroic mirrors 30B, 30R, and 30G are made incident as reading beams to the SLMs 40BS, 40RS, and 40GS, respectively. The writing images of the left eye system corresponding to the respective colors are written in the SLMs 40BS, 40RS, and 40GS by the CRTs 43BL, 43RL, and 43GL. Thus, when the modulated light beams emerging from the respective SLMs 40BS, 40RS, and 40GS are projected onto the screen 60, the modulated light beams are multiplexed to form a full color projection image of the left eye system on the screen 60. Accordingly, the observer can observe a stereoscopic image when observing the projection images of the left eye system and the right eye system formed on the screen 60 through polarization glasses.

The projection apparatus of the present embodiment is constructed as a full color stereoscopic image projection apparatus by modifying the full color projection apparatus shown in FIG. 10 in such a manner that the writing images corresponding to the projection images of the right eye system and the left eye system of the respective colors are written in the SLMs 40BP and 40BS, SLMs 40RP and 40RS, and SLMs 40GP and 40GS. Therefore, the full color image projection apparatus can be readily changed into the full color stereoscopic image projection apparatus simply by changing the writing images formed in the CRTs. The present embodiment may also be modified, similarly as in the tenth embodiment, in such a manner that the writing images corresponding to the projection images of the right eye system are written in the SLMs 40BS, 40RS, and 40GS and the writing images corresponding to the projection images of the left eye system in the SLMs 40BP, 40RP, and 40GP.

Figure 14:
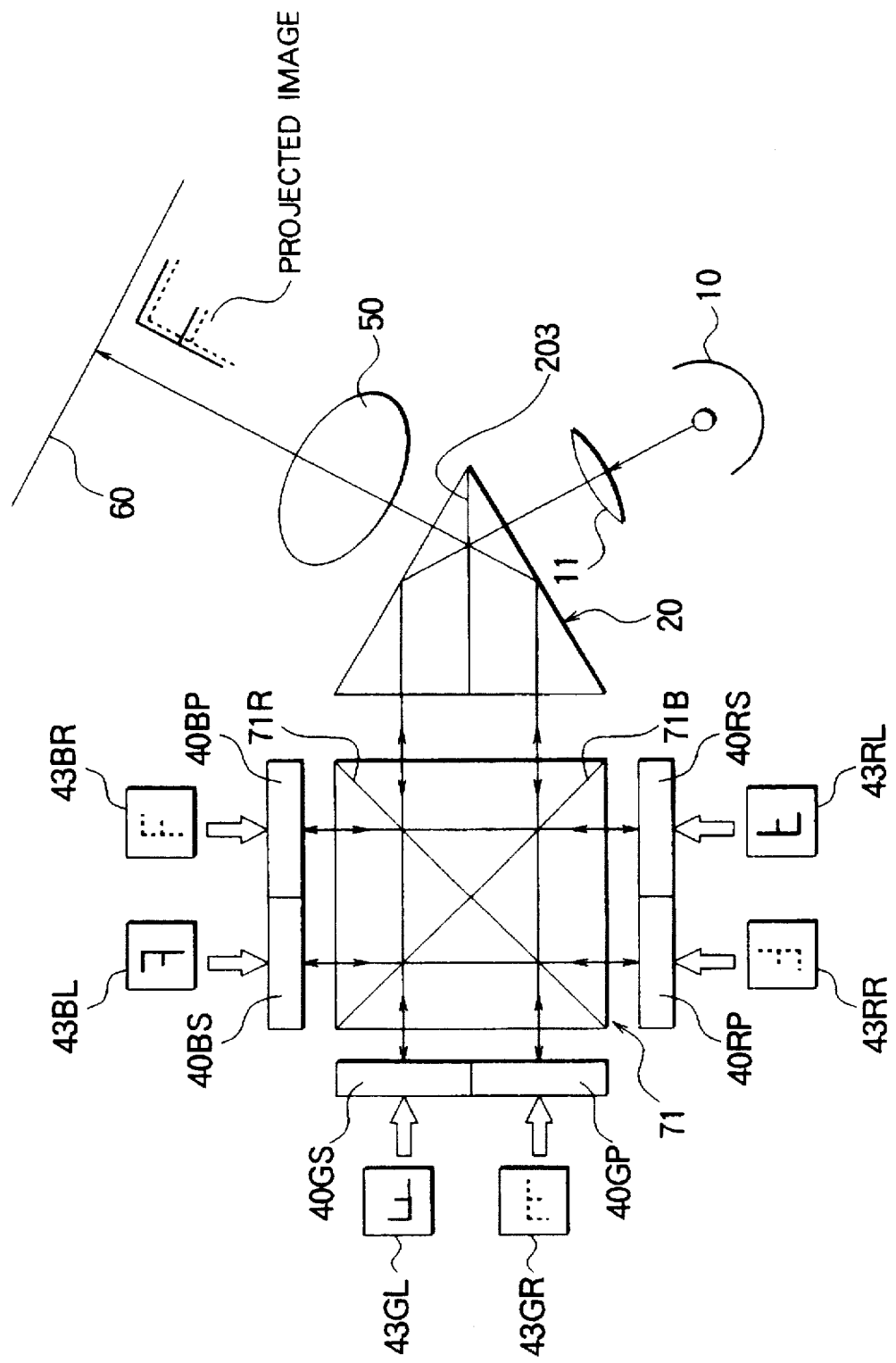
FIG. 14 is a drawing to show a twelfth embodiment of the present invention.

FIG. 14 is a modification of the eleventh embodiment, which is a full color stereoscopic image projection apparatus obtained by modifying the apparatus of FIG. 9 in such a manner that the CRTs 42BP, 42RP, 42GP in FIG. 9 are replaced by CRTs 43BR, 43RR, and 43GR, respectively, for forming the writing images corresponding to the projection images of the right eye system of the respective colors and that the CRTs 42BS, 42RS, and 42GS in FIG. 9 are replaced by the CRTs 43BL, 43RL, and 43GL, respectively, for forming the writing images corresponding to the projection images of the left eye system of the respective colors. This projection apparatus can also achieve the same effects as the projection apparatus of FIG. 13 as described above.

In the embodiments as described above, the optical writing spatial light modulator may be replaced by a reflection type liquid crystal display apparatus such as an electric writing reflection type liquid crystal device. Further, different SLMs are used for the respective polarized beams in each color, but a possible modification is such that one SLM is split into two segments and the writing image of P polarized beam is written in one segment while the writing image of S polarized beam in the other segment. With the stereoscopic image projection apparatus, similarly, the writing image corresponding to the projection image of the right eye system may be written in the one segment and the writing image corresponding to the projection image of the left eye system in the other segment. Also, writing image forming means such as a liquid crystal display device, for example, can be used in place of CRT. Namely, writing image may be written with writing image forming means of the construction as included in the embodiments shown in FIGS. 2, 3, 4 and 5.

As described above, according to the present invention, the polarizing optical element splits the light beam from the light source into two polarized beams, and using the two polarized beams as reading beams, same projection images are projected one over another on the screen, which can improve the utilization factor of light source and can obtain brighter projection images.

Also, the projection image of the right eye system is formed on the screen, using one polarized light beam separated by the polarizing optical element, and the projection image of the left eye system is superimposed on the right eye projection image on the screen, using the other polarized light beam, whereby a bright stereoscopic image can be easily obtained.

FIG. 15 to FIG. 18 show PBSs as the optical element that can be applied in the present invention.

Figure 15:
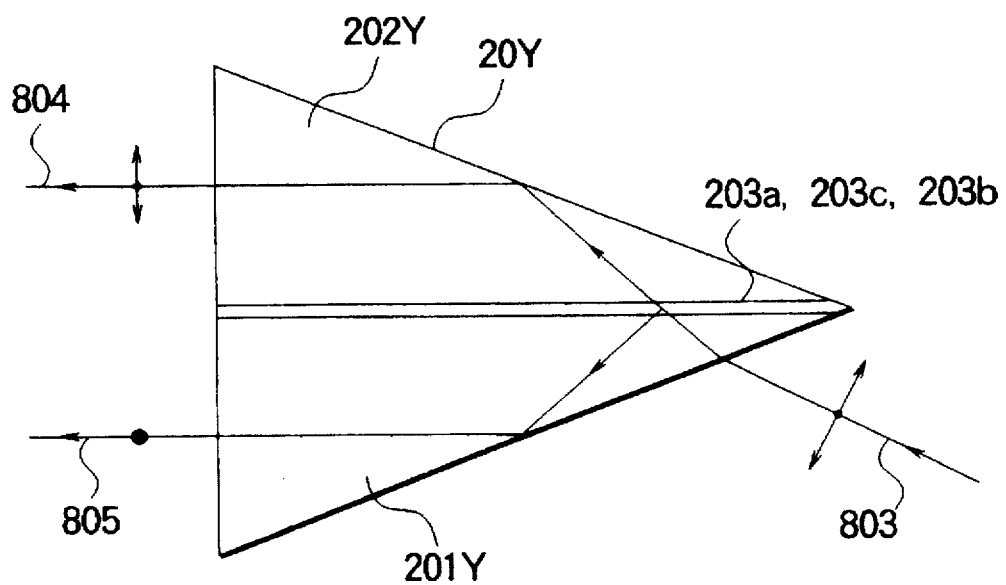
FIG. 15 is a drawing to show an example of the optical element used in the present invention.

The PBS 20Y shown in FIG. 15 has a principal cross section of an isosceles triangle with a vertex angle of 45 degrees as comprised of two cemented rectangular prisms 201Y, 202Y made in same size and shape and of a material of a light flint glass with refractive index 1.65 and each shaped in a cross section of a right-angled triangle with internal angles of 90 degrees, 67.5 degrees, and 22.5 degrees. The PBS 20Y is constructed by forming thin film groups 203a, 203b on right parts of second faces different from the hypotenuses of these rectangular prisms and bonding them with an adhesive layer 203 to each other. These thin film groups are multi-layer films each composed of a combination of high index thin films and low index thin films, as explained referring to FIG. 19 for the embodiment of FIG. 1. This PBS was produced by forming the separate multi-layer films 203a, 203b on the corresponding surfaces of the respective prisms 201Y, 202Y and forming the adhesive layer 203c between them, but in addition to this method, the present invention may employ another method in which a film group consisting of the multi-layer films 203a, 203b and having the function of polarization splitting film is formed on either one of the prisms 201Y and 202Y and the adhesive layer 203c is formed between the polarization splitting film group and the surface of the other prism with no film.

The light beam 803 from the light source is incident at an incidence angle of 39.2 degrees into this PBS, i.e., the slant surface of prism 201Y from the bottom right, and is refracted at an angle of refraction of 22.5 degrees to be incident at an incidence angle of 45 degrees to the surface (second surface) of the thin film groups 203a, 203b and then to be split into S polarized beam reflected and P polarized beam transmitted by the action of these thin film groups. Rays of the S polarized beam reflected are incident at an incidence angle of 67.5 degrees to the slant surface of prism 201Y and are totally reflected thereby to be emergent normally from the third surface. Rays of the P polarized beam transmitted are incident at an incidence angle of 67.5 degrees to the slant surface of the prism 202Y and are totally reflected thereby to be emergent normally from the third surface. This arrangement permits the rays of the S polarized beam and P polarized beam to be output in parallel with each other and in the same direction, and can make optical pathlengths of the S polarized beam and P polarized beam after polarization splitting equal to each other in the PBS.

Figure 16:
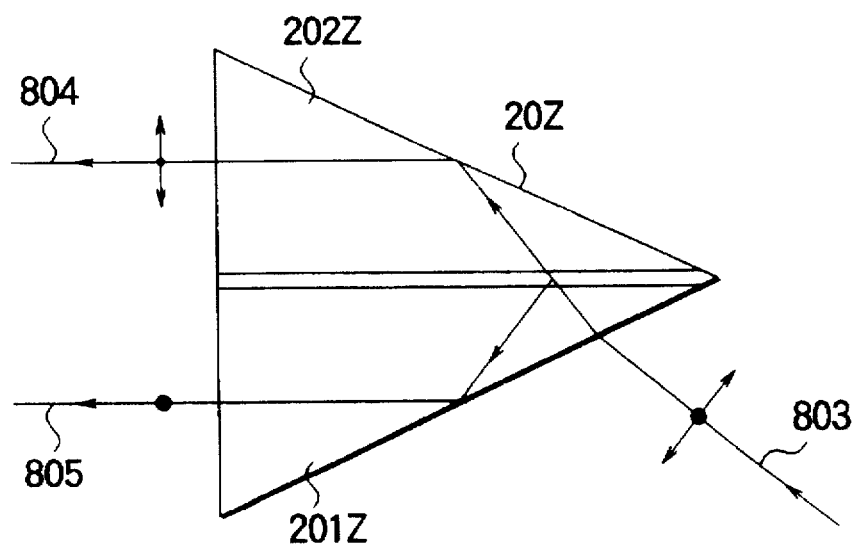
FIG. 16 is a drawing to show an example of the optical element used in the present invention.

The PBS shown in FIG. 16 is different from the PBS of FIG. 15 in that the internal angles of the original prisms having the principal cross section of a right-angled triangle are 90 degrees, 64 degrees, and 26 degrees and in that the prisms are made of a material of a dense flint glass of refractive index 1.90. The light beam 803 from the light source is incident at an incidence angle of 23.3 degrees into the present PBS and is refracted at a refraction angle of 12 degrees, and the refracted light is incident at an incidence angle of 38 degrees to the surface (second surface) of the thin film groups 203a, 203b to be split into S polarized beam reflected and P polarized beam transmitted by the action of these thin film groups. Rays of the S polarized beam reflected are incident at an incidence angle of 64 degrees to the slant surface of prism 201Z and are totally reflected thereby to be emergent normally from the third surface. Rays of the P polarized beam transmitted are incident at an incidence angle of 64 degrees to the slant surface of prism 202Z and are totally reflected thereby to be emergent normally from the third surface. The operation after this is the same as in case of the PBS of FIG. 15.

Another PBS is next explained. This embodiment is an example in which the original prisms has the principal cross section of a right-angled triangle with the internal angles of 90 degrees, 64.8 degrees, and 25.2 degrees and the prisms are made of a glass having the refractive index of 1.84 and the photoelastic constant of substantially zero (substantially zero means that the photoelastic constant is in the range of from about −0.1 to about 0.1 ($10^{-8}$ cm$^2$/N) for the light incident from the light source into the PBS, for example). The light from the light source is incident at an incidence angle of 27 degrees into the present PBS and is refracted at a refraction angle of 14.3 degrees, and the refracted light is incident at an incidence angle of 39.5 degrees to the thin film groups to be split into S polarized beam reflected and P polarized beam transmitted by the action of these thin film groups. The S polarized beam is incident at an incidence angle of 64.8 degrees to the slant surface of prism and is totally reflected thereby to be emergent normally from the third surface. Since the prisms have the photoelastic constant of substantially zero, the linearly polarized light produced by the action of the thin film groups is free of birefringence in the prisms, whereby the linearly polarized light can be obtained in a good quality.

In the PBS as described above, the vertex angle thereof (which is 26 degrees×2=52 degrees for the PBS of FIG. 16) generally depends upon the refractive index of the material of prisms and the index ratio of plural thin films used, and becomes greater as the refractive index of the material increases or as the index ratio of the thin films increases; the vertex angle is preferably in the range of 30 degrees to 60 degrees.

Although the above embodiments showed only the PBSs, they can be used as polarization converting elements with a half wave plate set in either one optical path of P polarized beam or S polarized beam emergent therefrom to convert P polarized beam into S polarized beam (and S polarized beam into P polarized beam) and thus to output light of single polarization.

As detailed above, because the PBS is so arranged that the polarized light beams after polarization splitting by the thin film groups are totally reflected by the internal surfaces of PBS then to emerge from the PBS, the optical pathlengths of the two polarized light beams are equal to each other and the polarized beams are emergent in parallel with each other in the same direction. As described in the embodiments, the incident light into the prism is not incident along the normal line to the prism plane into the PBS, but at a predetermined angle. Thus, the total reflection on the internal surfaces of prisms is effected at shallow angles, which allows a great tolerance of angle for total reflection, thus decreasing losses of light. The actual rays incident into the polarizer are not always perfectly parallel rays, but include non-parallel components. Among such non-parallel rays, rays at angles deviating from the law of total reflection are not totally reflected, thus being lost. The above PBS has a great tolerance of the angles, a rate of totally reflected rays is large, and the losses of light are small as a result. Since the incidence angle is inclined relative to the normal line to the incident plane in the present invention, the S polarized beam and P polarized beam can be emergent in parallel with each other in the same direction and along the direction of the normal line to the emergent plane. This increases degrees of freedom in refractive index and shape of prisms, thereby making design easier. If the angle of incidence is parallel to the normal line, the angle of incidence to the thin film groups in the polarization splitting portion is naturally determined, which remains only two degrees of freedom in designing the polarization splitting film the refractive index of glass and refractive indices of thin films forming the polarization splitting film groups. Particularly, where a glass with photoelastic constant of substantially zero is used as a glass for forming the polarizer, the refractive index is almost fixed, thus leaving no degree of freedom. In this case, designing with only degrees of freedom of the thin films is extremely hard. The present invention increased the degrees of freedom for the angle of incidence, for example three degrees of freedom for normal glasses, and two degrees of freedom for glasses with the photoelastic constant of zero, thus facilitating designing.

Preferably, the rectangular prisms are made of a glass with the photoelastic constant of substantially zero, whereby the rectangular prisms can demonstrate the optical isotropy substantially even if the rectangular prisms are subject to thermal stress or mechanical external stress due to a holder holding the polarizer or heat of incident light. Thus, there appears little optical path difference between light beams propagating in the rectangular prisms.

When the rectangular prisms are made of an optical glass, the optical thin film groups are formed on the optical glass. In this case, when thermal stress or mechanical external stress acts on the optical glass, optical anisotropy is induced in the glass because of the photoelastic effect. This optical anisotropy could be a hindrance against achieving desired performance for the polarizer. Thus, the present invention preferably provides the polarizer in which the two rectangular prisms are made of a glass with the photoelastic constant of substantially zero.

Figure 17:
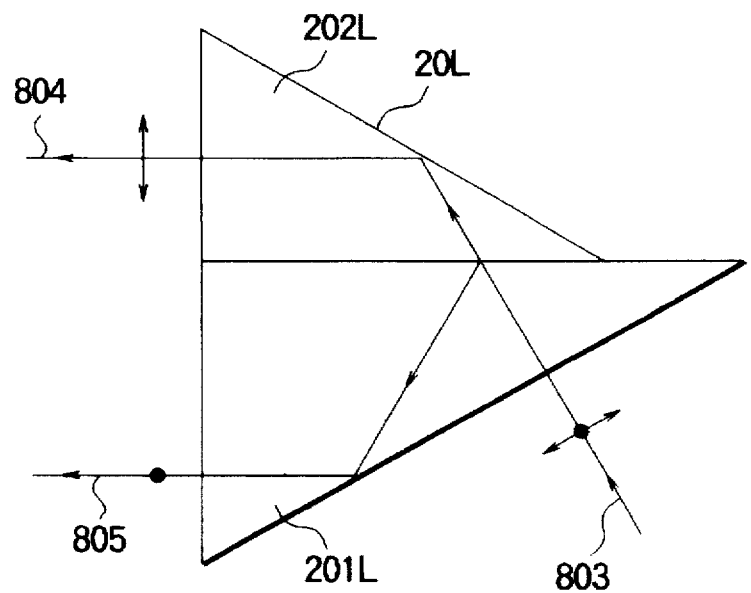
FIG. 17 is a drawing to show an example of the optical element used in the present invention.
Figure 22:
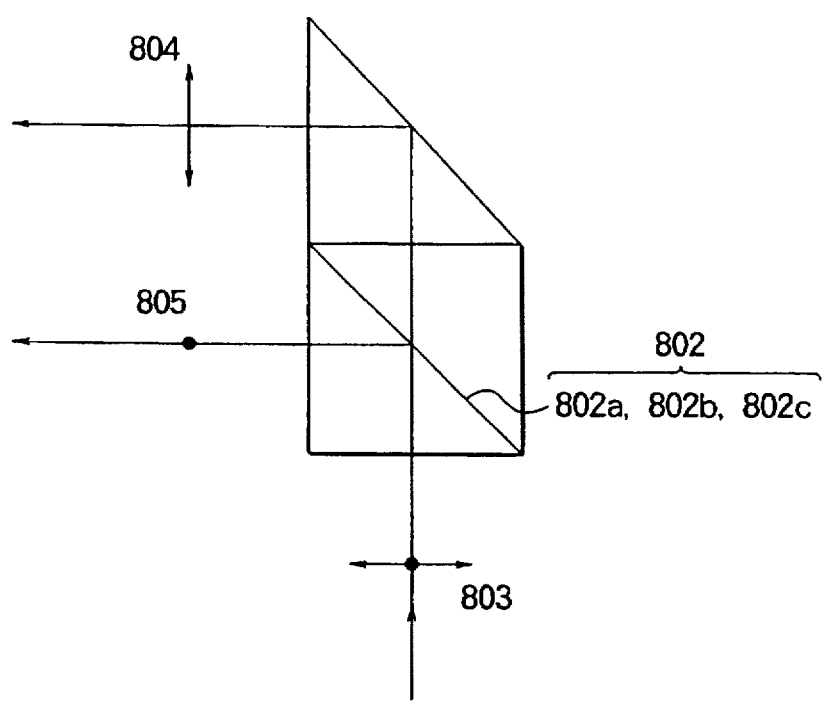
FIG. 22 is a drawing to show another prior art example.
Figure 23:
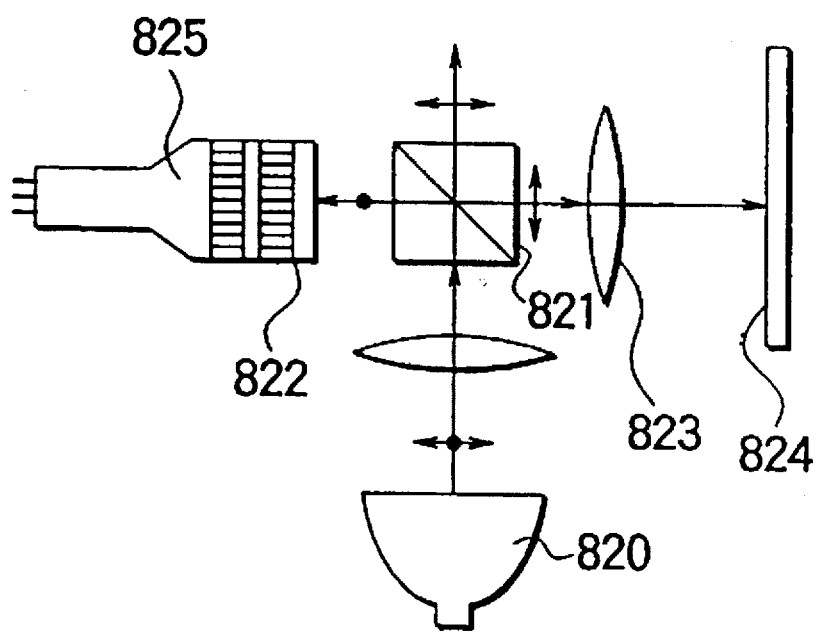
FIG. 23 is a drawing to show another prior art example.

In the above embodiments, the PBS as the optical element used in the present invention was explained as to be constructed of a pair of prisms in a principal cross section of same right-angled triangle. However, the prisms may have principal cross sections of similar right-angled triangles, as shown in FIG. 17. There is a difference more or less between optical paths of emergent beams 804 and 805, but it causes no problem, as against the cases including another totally reflecting prism as in the case of the prior art of FIG. 22.

Figure 18:
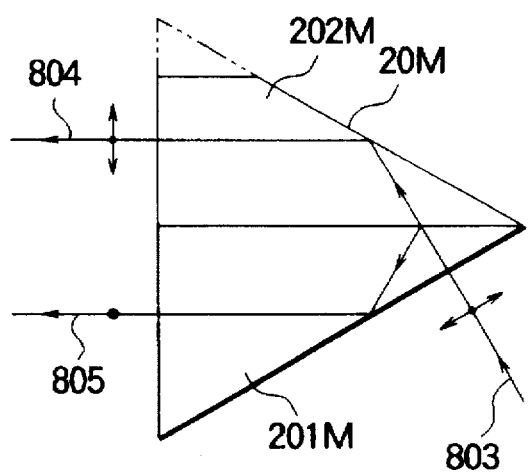
FIG. 18 is a drawing to show an example of the optical element used in the present invention.

Although the prisms composing the optical element PBS used in the present invention were described as right-angled triangles, they may be prisms obtained by cutting unnecessary portions off like the prism 202M of FIG. 18. The point is that there remains the substantial part of the right-angled triangle. From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No. 200007/1994 filed on Aug. 25, 1994, 283203/1994 filed on Nov. 17, 1994, 326198/1994 filed on Dec. 27, 1994 and 099451/1994 filed on May 13, 1994 are hereby incorporated by reference.

What is claimed is:

1. An optical apparatus comprising:
   a first and second rectangular prisms, each having a cross section of a right-angled triangle with a first vertex angle larger than a second vertex angle, said second vertex angle being less than 45°, said first and second rectangular prisms having same respective vertex angles;
   a first optical element having a polarization splitting portion comprised of an optical thin film group interposed between faces extending in a longitudinal direction from a side between said second vertex angle and a right angle in the respective triangles of said first and second rectangular prisms, said first optical element and two said rectangular prisms forming a unitary double prism structure; and
   an image providing unit comprising a first and second image providing areas for supplying a first and second image information to faces extending in a longitudinal direction from a side opposite to said second vertex angle in the respective triangles of said first and second rectangular prisms, said first and second image information having predetermined optical relationship therebetween.

2. The optical apparatus according to claim 1, wherein said second vertex angle is not more than 30°.

3. The optical apparatus according to claim 1, wherein said predetermined optical relationship between said first and second image information relates to a difference in polarization.

4. The optical apparatus according to claim 1, wherein said predetermined optical relationship relates to a reflected image relationship.

5. The optical apparatus according to claim 1, further comprising:
   a third and fourth rectangular prisms, each having a cross section of a right-angled triangle with a first vertex angle larger than a second vertex angle, said third and fourth rectangular prisms having same respective vertex angles; and
   a second optical element having an amplitude splitting portion comprised of an optical thin film group interposed between faces extending in a longitudinal direction from a side between said second vertex angle and a right angle in the respective triangles of said third and fourth rectangular prisms, said second optical element and two said rectangular prisms forming a unitary double prism structure, wherein said first and second image information are provided on said first and second areas according to light which are provided from faces extending in a longitudinal direction from a side opposite to said second vertex angle in the respective triangles of said third and fourth rectangular prisms to provide the image information to the other side image providing unit.

6. An optical apparatus, comprising:

a pair of prisms having cross sections of right-angled triangles similar to each other, each having a vertex angle of less than 45°, said prisms being cemented to each other on their side faces between a right angle and said vertex angle of less than 45° to form a unitary double prism structure;

a reading light source for supplying a reading light beam onto a hypotenuse face of one of said pair of prisms;

a first optical element having a polarization splitting portion comprised of an optical thin film group formed on the cemented side faces of said double prism structure, said polarization splitting portion splitting and polarizing said reading light beam incident thereto into a P polarized beam and a S polarized beam, said P and S polarized beams being linearly polarized and having mutually orthogonal planes of polarization, said two polarized beams travelling generally parallel to each other after being totally reflected by internal surfaces of hypotenuse faces of said pair of prisms and exiting from side faces opposite to said vertex angles of less than 45° of said prism; and an illuminated body for reflecting and modulating said P and S polarized beams by different portions thereof, said P and S polarized beams then being incident to said side faces opposite to said vertex angles of less than 45° to travel generally parallel to each other, said P and S polarized beams being multiplexed by said polarization splitting portion after being totally reflected by the internal faces of the hypotenuse faces of said pair of prisms, and a polarization component being taken from the hypotenuse face of the other of said pair of prisms for analysis.

7. The optical apparatus according to claim 6, wherein said illuminated body is a spatial light modulator having a first and second regions as split halves adjacent to each other, wherein said first region comprises:

a first light-receiving surface for receiving and reflecting said P polarized beam, and a second light-receiving surface for receiving a writing beam, said P polarized beam reflected by said first light-receiving surface being modulated according to an intensity of said writing beam received by said second light-receiving surface; and wherein said second region comprises:

a third light-receiving surface for receiving and reflecting said S polarized beam, and a fourth light-receiving surface for receiving a writing beam, said S polarized beam reflected by said third light-receiving surface being modulated according to an intensity of said writing beam received by said fourth light-receiving surface.

8. The optical apparatus according to claim 7, further comprising a projection optical system for projecting said polarization component toward a projection surface.

9. The optical apparatus according to claim 8, wherein one of said writing beams corresponds to a projection light beam for a right eye system and the other of said writing beams to a projection light beam for a left eye system.

10. The optical apparatus according to claim 8, further comprising:

a writing light source for emitting a light beam; and a beam splitter having a reflecting film with generally equal reflectivity and transmittance, said beam splitter splitting an amplitude of said light beam from said writing light source to generate said writing beams received by said second and fourth light-receiving surfaces respectively.

11. The optical apparatus according to claim 8, further comprising:

a writing light source for emitting said a light beams;

a second optical element comprising a pair of prisms having cross sections of right-angled triangles similar to each other, each having a vertex angle of less than 45°, said prisms being cemented to each other on their side faces between a right angle and said vertex angle of less than 45° to form a unitary double prism structure, and a polarization splitting portion comprised of an optical thin film group formed on the cemented side faces of said double prism structure, said light beam being incident into a hypotenuse face of one of said pair of prisms, said polarization splitting portion splitting and polarizing said light beam into a P polarized beam and a S polarized beam, said P and S polarized beams being linearly polarized and having mutually orthogonal planes of polarization, said two polarized beams travelling generally parallel to each other after being totally reflected by internal surfaces of hypotenuse faces of said pair of prisms and exiting from side faces opposite to said vertex angles of less than 45° of said prism, said P and S polarized beams being received by said second and fourth light-receiving surfaces respectively; and an optical switch disposed between said writing light source and said spatial light modulator, said optical switch being for alternately switching said light beam emitted from said writing light source between P polarized beam and S polarized beam.

12. An optical apparatus comprising:

a reading light source for supplying a reading light beam;

a pair of prisms having cross sections of right-angled triangles similar to each other, each having a vertex angle of less than 45°, said prisms being cemented to each other on their side faces between a right angle and said vertex angle of less than 45° to form a unitary double prism structure, said reading light beam being incident onto a hypotenuse face of one of said pair of prisms;

a first optical element having a polarization splitting portion comprised of an optical thin film group formed on the cemented side faces of said double prism structure, said polarization splitting portion splitting and polarizing said reading light beam incident thereto into a P polarized beam and a S polarized beam, said P and S polarized beams being linearly polarized and having mutually orthogonal planes of polarization, said two polarized beams travelling generally parallel to each other after being totally reflected by internal surfaces of hypotenuse faces of said pair of prisms and exiting from side faces opposite to said vertex angles of less than 45° of said prism;

a three-color splitting optical system for splitting each of said P and S polarized beams into beams of three primary colors;

spatial light modulators having light-receiving surfaces, each light-receiving surface receiving and reflecting one of said beams of three primary colors of said P and S polarized beams or a writing beam corresponding thereto, said light modulators modulating said P and S polarized beams in accordance with said writing beams received for each of said beams of three primary colors, said modulated P and S polarized beams then being incident to said side faces opposite to said vertex angles of less than 45° to travel generally parallel to each other, said P and S polarized beams being multiplexed by said polarization splitting portion after being totally reflected by the internal faces of the hypotenuse faces of said pair of prisms, and a polarization component being taken from the hypotenuse face of the other of said pair of prisms; and a projection optical system for projecting said polarization component to a projection surface.

13. The optical apparatus according to claim 12, wherein one of said writing beams corresponds to a projection beam for a right eye system and the other to a projection beam for a left eye system.

14. An optical apparatus comprising:

a polarizing optical element for splitting and polarizing a light beam into two reading beams;

a spatial light modulator for receiving said two reading beams and writing beams in respective regions to form writing images corresponding to said two reading beams, said spatial light modulator modulating said reading beams according to said writing beams; and a projection optical system for projecting each of the beams modulated by said spatial light modulator, then entering said polarizing optical element, and thereafter emerging therefrom, toward a projection surface.

15. The optical apparatus according to claim 14, wherein one of said writing beams to form the writing images in the respective regions corresponds to a projection beam for a right eye system and the other to a projection beam for a left eye system.

16. An optical apparatus comprising:

a polarizing optical element for splitting and polarizing a light beam into two reading beams;

a three-color splitting optical system for splitting each of said two reading beams into beams of three primary colors;

a spatial light modulator for receiving said beams of three primary colors and writing beams in respective regions to form writing images corresponding to said two reading beams, and said spatial light modulator modulating said reading beams according to said writing beams; and a projection optical system for projecting each of the beams modulated by said spatial light modulator, entering said polarizing optical element, and thereafter emerging therefrom, toward a projection surface.

17. The optical apparatus according to claim 16, wherein one of the writing beams to form the writing images in the respective regions corresponds to a projection beam for a right eye system and the other to a projection beam for a left eye system.

* * * * *